United States Patent
Le Cocq

(10) Patent No.: US 7,372,982 B2
(45) Date of Patent: May 13, 2008

(54) USER INTERFACE FOR MOLECULAR ARRAY FEATURE ANALYSIS

(75) Inventor: Christian A. Le Cocq, Menlo Park, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 839 days.

(21) Appl. No.: 10/342,841

(22) Filed: Jan. 14, 2003

(65) Prior Publication Data

US 2004/0136576 A1 Jul. 15, 2004

(51) Int. Cl.
*G06K 9/00* (2006.01)

(52) U.S. Cl. ............................. 382/128; 382/168
(58) Field of Classification Search .............. 382/128, 382/162, 168; 345/440
See application file for complete search history.

(56) References Cited

U.S. PATENT DOCUMENTS

2003/0006986 A1   1/2003   Dick et al.

FOREIGN PATENT DOCUMENTS

GB   2398217 A   8/2004

OTHER PUBLICATIONS

Texas Instruments T-38 User Manual, Chapter 3 pp. 3-1 to 3-28 See Especially p. 3-18.

*Primary Examiner*—Duy M Dang

(57) ABSTRACT

A method to allow an analyst or other user of molecular-array data to directly tailor pixel-intensity integration of scanned pixel-based representations of features of a molecular array to produce feature signals. The method is embodied in a graphical user interface that allows an analyst or other molecular-array user to input pixel-intensity-weighting functions into a computational system that applies the weighting functions prior to producing integrated feature signals. The GUI provides a user with the ability to select the origin of a feature-centric rectilinear coordinate system, to input a function that specifies the function that is applied to the raw pixel intensities within the region of interest prior to integration of the pixel intensities within the region of interest to produce a feature signal.

13 Claims, 25 Drawing Sheets

| 7 | center x | 10 | center y |

| >-sqrt[16-x^2*8/18]&&<<br>sqrt[16-x^2*8/18] | ROI |

| | weighting function  | plane projection
 yz slice
 xz slice

1911

| 7 | center x | 10 | center y |

```
>-sqrt[16-x^2*8/18]&&<         ROI                    1908
sqrt[16-x^2*8/18]
```

1907
```
Exp[-x^2/20]*Exp[-y^2/10]-
Exp[-x^2/15]*Exp[-y^2/7]+1/5*    weighting function  ⊙
Exp[-x^2/2]*Exp[-y^2]
```

○ plane projection
○ yz slice
⊙ xz slice

| | | | |
|---|---|---|---|
| 7 | center x | 10 | center y |

| | |
|---|---|
| >-sqrt[16-x^2*8/18]&&<br>sqrt[16-x^2*8/18] | ROI |

| | |
|---|---|
| Exp[-x^2/20]*Exp[-y^2/10]-<br>Exp[-x^2/15]*Exp[-y^2/7]+1/5*<br>Exp[-x^2/2]* | weighting function  |

○ plane projection
⊙ yz slice
○ xz slice

USER INTERFACE FOR MOLECULAR ARRAY FEATURE ANALYSIS

TECHNICAL FIELD

The present invention is related to computer software for processing and analyzing data extracted from a molecular array and, in particular, to a method for providing to a user an intuitive and easy-to-use graphical interface for choosing a weighting function to weight the signal-intensity values associated with a pixel-based representation of a molecular-array feature.

BACKGROUND OF THE INVENTION

The present invention is related to computationally aided analysis of molecular-array data. In order to facilitate discussion of the graphical user interface ("GUI"), a general background of molecular-array technology is provided in this section, and the paragraphs that follow.

Molecular arrays are also referred to as "microarrays" and simply as "arrays" in the literature. Molecular arrays are not regular patterns of molecules, such as occur on the faces of crystalline materials, nor arbitrary patterns produced in a manufacturing or printing processes, but, as the following discussion shows, molecular arrays are manufactured articles specifically designed for analysis of solutions of compounds of chemical, biochemical, biomedical, and other interests.

Array technologies have gained prominence in biological research and are likely to become important and widely used diagnostic tools in the healthcare industry. Currently, molecular-array techniques are most often used to determine the concentrations of particular nucleic-acid polymers in complex sample solutions. Molecular-array-based analytical techniques are not, however, restricted to analysis of nucleic acid solutions, but may be employed to analyze complex solutions of any type of molecule that can be optically or radiometrically scanned or read and that can bind with high specificity to complementary molecules synthesized within, or bound to, discrete features on the surface of an array. Because arrays are widely used for analysis of nucleic acid samples, the following background information on arrays is introduced in the context of analysis of nucleic acid solutions following a brief background of nucleic acid chemistry.

Deoxyribonucleic acid ("DNA") and ribonucleic acid ("RNA") are linear polymers, each synthesized from four different types of subunit molecules. The subunit molecules for DNA include: (1) deoxy-adenosine, abbreviated "A," a purine nucleoside; (2) deoxy-thymidine, abbreviated "T," a pyrimidine nucleoside; (3) deoxy-cytosine, abbreviated "C," a pyrimidine nucleoside; and (4) deoxy-guanosine, abbreviated "G," a purine nucleoside. FIG. 1 illustrates a short DNA polymer 100, called an oligomer, composed of the following subunits: (1) deoxy-adenosine 102; (2) deoxy-thymidine 104; (3) deoxy-cytosine 106; and (4) deoxy-guanosine 108. When phosphorylated, subunits of DNA and RNA molecules are called "nucleotides" and are linked together through phosphodiester bonds 110-115 to form DNA and RNA polymers. A linear DNA molecule, such as the oligomer shown in FIG. 1, has a 5' end 118 and a 3' end 120. A DNA polymer can be chemically characterized by writing, in sequence from the 5' end to the 3' end, the single letter abbreviations for the nucleotide subunits that together compose the DNA polymer. For example, the oligomer 100 shown in FIG. 1 can be chemically represented as "ATCG." A DNA nucleotide comprises a purine or pyrimidine base (e.g. adenine 122 of the deoxy-adenylate nucleotide 102), a deoxy-ribose sugar (e.g. deoxy-ribose 124 of the deoxy-adenylate nucleotide 102), and a phosphate group (e.g. phosphate 126) that links one nucleotide to another nucleotide in the DNA polymer.

The DNA polymers that contain the organization information for living organisms occur in the nuclei of cells in pairs, forming double-stranded DNA helixes. One polymer of the pair is laid out in a 5' to 3' direction, and the other polymer of the pair is laid out in a 3' to 5' direction. The two DNA polymers in a double-stranded DNA helix are therefore described as being anti-parallel. The two DNA polymers, or strands, within a double-stranded DNA helix are bound to each other through attractive forces including hydrophobic interactions between stacked purine and pyrimidine bases and hydrogen bonding between purine and pyrimidine bases, the attractive forces emphasized by conformational constraints of DNA polymers. Because of a number of chemical and topographic constraints, double-stranded DNA helices are most stable when deoxy-adenylate subunits of one strand hydrogen bond to deoxy-thymidylate subunits of the other strand, and deoxy-guanylate subunits of one strand hydrogen bond to corresponding deoxy-cytidilate subunits of the other strand.

FIGS. 2A-B illustrates the hydrogen bonding between the purine and pyrimidine bases of two anti-parallel DNA strands. AT and GC base pairs, illustrated in FIGS. 2A-B, are known as Watson-Crick ("WC") base pairs. Two DNA strands linked together by hydrogen bonds forms the familiar helix structure of a double-stranded DNA helix. FIG. 3 illustrates a short section of a DNA double helix 300 comprising a first strand 302 and a second, anti-parallel strand 304.

Double-stranded DNA may be denatured, or converted into single stranded DNA, by changing the ionic strength of the solution containing the double-stranded DNA or by raising the temperature of the solution. Single-stranded DNA polymers may be renatured, or converted back into DNA duplexes, by reversing the denaturing conditions, for example by lowering the temperature of the solution containing complementary single-stranded DNA polymers. During renaturing or hybridization, complementary bases of anti-parallel DNA strands form WC base pairs in a cooperative fashion, leading to reannealing of the DNA duplex.

The ability to denature and renature double-stranded DNA has led to the development of many extremely powerful and discriminating assay technologies for identifying the presence of DNA and RNA polymers having particular base sequences or containing particular base subsequences within complex mixtures of different nucleic acid polymers, other biopolymers, and inorganic and organic chemical compounds. One such methodology is the array-based hybridization assay. FIGS. 4-7 illustrate the principle of the array-based hybridization assay. An array (402 in FIG. 4) comprises a substrate upon which a regular pattern of features is prepared by various manufacturing processes. The array 402 in FIG. 4, and in subsequent FIGS. 5-7, has a grid-like 2-dimensional pattern of square features, such as feature 404 shown in the upper left-hand corner of the array. Each feature of the array contains a large number of identical oligonucleotides covalently bound to the surface of the feature. These bound oligonucleotides are known as probes. In general, chemically distinct probes are bound to the different features of an array, so that each feature corresponds to a particular nucleotide sequence. In FIGS. 4-6, the principle of array-based hybridization assays is illustrated with respect to the single feature 404 to which a number of identical probes 405-409 are bound. In practice, each feature of the array contains a high density of such probes but, for the sake of clarity, only a subset of these are shown in FIGS. 4-6.

Once an array has been prepared, the array may be exposed to a sample solution of target DNA or RNA molecules (410-413 in FIG. 4) labeled with fluorophores, chemiluminescent compounds, or radioactive atoms 415-418. Labeled target DNA or RNA hybridizes through base pairing interactions to the complementary probe DNA, synthesized on the surface of the array. FIG. 5 shows a number of such target molecules 502-504 hybridized to complementary probes 505-507, which are in turn bound to the surface of the array 402. Targets, such as labeled DNA molecules 508 and 509, that do not contains nucleotide sequences complementary to any of the probes bound to array surface do not hybridize to generate stable duplexes and, as a result, tend to remain in solution. The sample solution is then rinsed from the surface of the array, washing away any unbound-labeled DNA molecules. In other embodiments, unlabeled target sample is allowed to hybridize with the array first. Typically, such a target sample has been modified with a chemical moiety that will react with a second chemical moiety in subsequent steps. Then, either before or after a wash step, a solution containing the second chemical moiety bound to a label is reacted with the target on the array. After washing, the array is ready for data acquisition by scanning or reading. Biotin and avidin represent an example of a pair of chemical moieties that can be utilized for such steps.

Finally, as shown in FIG. 6, the bound labeled DNA molecules are detected via optical or radiometric scanning or reading. Optical scanning and reading both involve exciting labels of bound labeled DNA molecules with electromagnetic radiation of appropriate frequency and detecting fluorescent emissions from the labels, or detecting light emitted from chemiluminescent labels. When radioisotope labels are employed, radiometric scanning or reading can be used to detect the signal emitted from the hybridized features. Additional types of signals are also possible, including electrical signals generated by electrical properties of bound target molecules, magnetic properties of bound target molecules, and other such physical properties of bound target molecules that can produce a detectable signal. Optical, radiometric, or other types of scanning and reading produce an analog or digital representation of the array as shown in FIG. 7, with features to which labeled target molecules are hybridized similar to 706 optically or digitally differentiated from those features to which no labeled DNA molecules are bound. In other words, the analog or digital representation of a scanned array displays positive signals for features to which labeled DNA molecules are hybridized and displays negative features to which no, or an undetectably small number of, labeled DNA molecules are bound. Features displaying positive signals in the analog or digital representation indicate the presence of DNA molecules with complementary nucleotide sequences in the original sample solution. Moreover, the signal intensity produced by a feature is generally related to the amount of labeled DNA bound to the feature, in turn related to the concentration, in the sample to which the array was exposed, of labeled DNA complementary to the oligonucleotide within the feature.

One, two, or more than two data subsets within a data set can be obtained from a single molecular array by scanning or reading the molecular array for one, two or more than two types of signals. Two or more data subsets can also be obtained by combining data from two different arrays. When optical scanning or reading is used to detect fluorescent or chemiluminescent emission from chromophore labels, a first set of signals, or data subset, may be generated by scanning or reading the molecular array at a first optical wavelength, a second set of signals, or data subset, may be generated by scanning or reading the molecular array at a second optical wavelength, and additional sets of signals may be generated by scanning or reading the molecular at additional optical wavelengths. Different signals may be obtained from a molecular array by radiometric scanning or reading to detect radioactive emissions one, two, or more than two different energy levels. Target molecules may be labeled with either a first chromophore that emits light at a first wavelength, or a second chromophore that emits light at a second wavelength. Following hybridization, the molecular array can be scanned or read at the first wavelength to detect target molecules, labeled with the first chromophore, hybridized to features of the molecular array, and can then be scanned or read at the second wavelength to detect target molecules, labeled with the second chromophore, hybridized to the features of the molecular array. In one common molecular array system, the first chromophore emits light at a red visible-light wavelength, and the second chromophore emits light at a green, visible-light wavelength. The data set obtained from scanning or reading the molecular array at the red wavelength is referred to as the "red signal," and the data set obtained from scanning or reading the molecular array at the green wavelength is referred to as the "green signal." While it is common to use one or two different chromophores, it is possible to use one, three, four, or more than four different chromophores and to scan or read a molecular array at one, three, four, or more than four wavelengths to produce one, three, four, or more than four data sets.

Many sophisticated computational techniques are applied to the raw, pixel-intensity-based data scanned from a molecular array. Many commercial systems employ a variety of techniques to scan the pixel-based image representation of molecular-array data to locate and index features, and to then extract data from the features and normalize extracted data. Quite often, these techniques produce satisfactory results. However, a great deal of seemingly random and systematic noise may be introduced into molecular-array data as a result of systematic errors that arise during manufacture of molecular arrays, during exposure of molecular arrays to sample solutions, and during post-exposure molecular-array processing. For example, when features are deposited by ink-jet technologies, the feature grid may be distorted due to mechanical irregularities, and features may be deposited in areas shaped differently from the desired disk shape. Because of the many different variables in chemical synthesis of probe molecules, probe molecules may end up distributed non-uniformly within the area of the molecular-array surface corresponding to a feature. During exposure of a molecular array to a sample solution, target molecules may be non-uniformly bound to molecular array features. Following exposure of the molecular array to a sample solution, features may be corrupted due to fingerprints, mechanical abrasion, chemical and particulate contamination, microbial growth, and various other types of events and processes.

FIGS. 8A-F illustrate a few of the many types of feature irregularities that may occur in a molecular array, and in the pixel-based representation of data scanned from a molecular array. In FIG. 8A, a feature 802 is seen with a desirable, circular disk shape perfectly aligned with an expected or calculated xy-position within a rectilinear coordinate grid used to describe feature positions on the surface of the molecular array or in the pixel-based representation of data extracted from a molecular array. However, as shown in FIG. 8B, a well-formed feature 804 may be translationally displaced with respect to an expected or calculated xy-position. Yet another type of irregularity that may occur is that the feature, rather than being disk shaped, may be instead elliptically shaped, as are the features in FIGS. 8C and 8D, 806 and 808, respectively. Note that, in general, the elliptical deformations, or directions of the major axes of elliptical features, tend to be oriented either vertically or horizontally with respect to the molecular array, and with respect to the rectilinear coordinate system describing positions of the surface of the molecular array, because mechanical irregularities in the manufacture of molecular arrays tend to produce distortions in the directions in which ink-jet pens, or other deposition devices, track across the surface of the molecular array.

Features may also be asymmetrically shaped, as is feature 810 in FIG. 8E, or may be symmetrically, but non-elliptically shaped, as is the feature 812 in FIG. 8F. The irregularities illustrated in FIGS. 8A-F all concern a region of interest, or data-containing area of a pixel-based representation of the data collected from the surface of a molecular array, that produces a significant signal above a calculated background signal. Many automated molecular-array-data processing systems attempt to automatically correct for the shape and position irregularities, examples of which are shown in FIGS. 8B-F. However, many of these automated systems are quite limited in the models that they employ for describing feature shapes and regions of interest. In many systems, a pixel-intensity centroid may be calculated from the pixels within a calculated region of interest in order to select a pixel corresponding to the center of the feature, from which subsequent calculations can be made. However, all of these methods may fail to properly account for feature shape and positional irregularities, and may lead to anomalies in signal data calculated from pixel-based representations of the data scanned from molecular arrays.

FIGS. 9-10 illustrate a second type of feature-signal irregularity, or non-uniformity, that commonly occurs in the pixel-based representation of data scanned from the surface of a molecular array. As shown in FIG. 9, a feature 902 in the scanned image of a molecular array comprises a number of pixels, such as pixel 904, within a region of interest corresponding to the feature. In the case of feature 902 in FIG. 9, the region of interest is disk shaped, and is centered about the grid-point origin 906. Each pixel within the region of interest, such as pixel 904, is associated with an intensity value, representing the signal strength read from the portion of the surface of the molecular array corresponding to the area and location of the pixel. FIG. 10 illustrates the signal intensities corresponding to each pixel within feature 902 of FIG. 9. In FIG. 10, the vertical height, in the z direction 1002, of the rectangular column rising from each pixel represents the signal intensity of that pixel. Note that the pixel intensities are relatively high at the center of the feature, and fall off dramatically towards the edge of the feature. Such a distribution of pixel intensities within the feature may arise from a variety of different sources. Chemical feature deposition methods may result in probe molecules being concentrated in central portions of a feature as the solution containing probe molecules or probe-molecule precursors deposited on the molecular-array surface evaporate inward from the original boundaries of the feature. Alternatively, different probe-synthetic or probe-deposition solutions may result in concentration of probe molecules in the original boundary regions of a deposited feature, producing an outer annular region of high intensity that falls off radially towards the center of the feature.

Automated feature extraction software may attempt to model signal distributions within features, and locally normalize intensities during computation of integrated pixel-intensity signals that represent the total signals for features scanned from a molecular array. However, such automated feature extraction methods are often constrained by relatively simplistic models used to model pixel-intensity distributions, and often do not allow for the knowledge of particular types of molecular arrays, or molecular-array experiments, to be employed in order to assist in integrating pixel intensities to produce feature signals. For these reasons, the designers, manufacturers, and, in particular, users of microarrays have all recognized the need for a more flexible method that would allow molecular-array users to tailor feature extraction and pixel-intensity integration to pixel-intensity-distribution models known to the users of molecular arrays based on the types of probe molecules included in the molecular arrays, the techniques by which the molecular arrays are manufactured, the types of experiments in which the molecular arrays are employed, and the types of contamination and post-exposure processing to which the molecular arrays may have been subjected prior to scanning.

SUMMARY OF THE INVENTION

One embodiment of the present invention provides a method to allow an analyst or other user of molecular-array data to directly tailor pixel-intensity integration of scanned pixel-based representations of features of a molecular array to produce feature signals. The method is embodied in an intuitive and easy-to-use graphical user interface ("GUI") that allows an analyst or other molecular-array user to input pixel-intensity-weighting functions into a computational system that applies the weighting functions prior to producing integrated feature signals. The GUI provides a user with the ability to select the origin of a feature-centric rectilinear coordinate system, to input a function that specifies the boundaries of a region of interest for the feature, and that allows the user to input a weighting function that is applied to the raw pixel intensities within the region of interest prior to integration of the pixel intensities within the region of interest to produce a feature signal. The GUI provides gray scale or color-coded plane-projection representation of the pixel intensities as well as cross-sections, or yz and xz slices through the pixel-intensity volume above the region of interest, to facilitate selection of appropriate weighting functions.

DETAILED DESCRIPTION OF THE INVENTION

Figure 1:
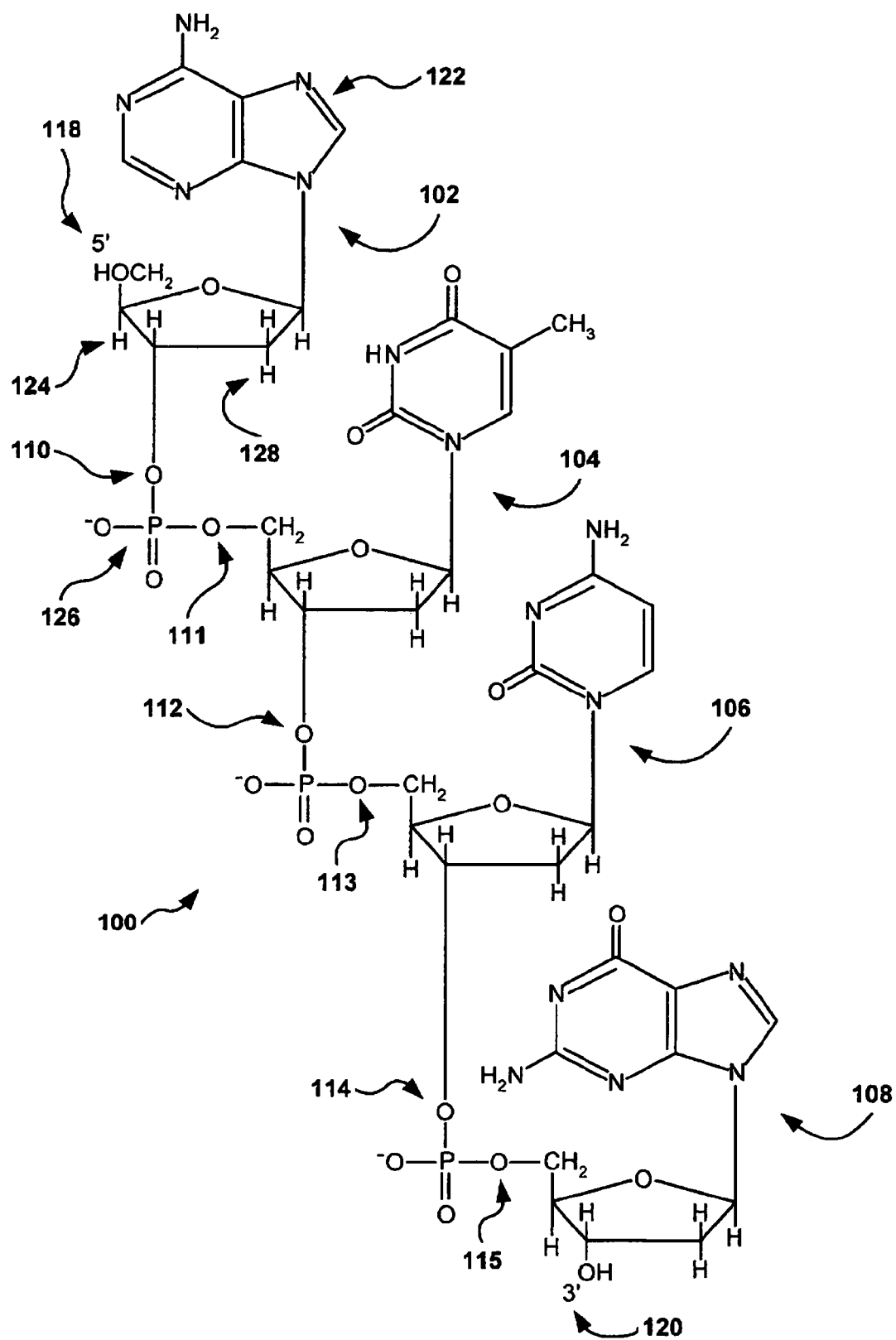
FIG. 1 illustrates a short DNA polymer 100, called an oligomer, composed of the following subunits: (1) deoxy-adenosine 102; (2) deoxy-thymidine 104; (3) deoxy-cytosine 106; and (4) deoxy-guanosine 108.
Figure 2A:
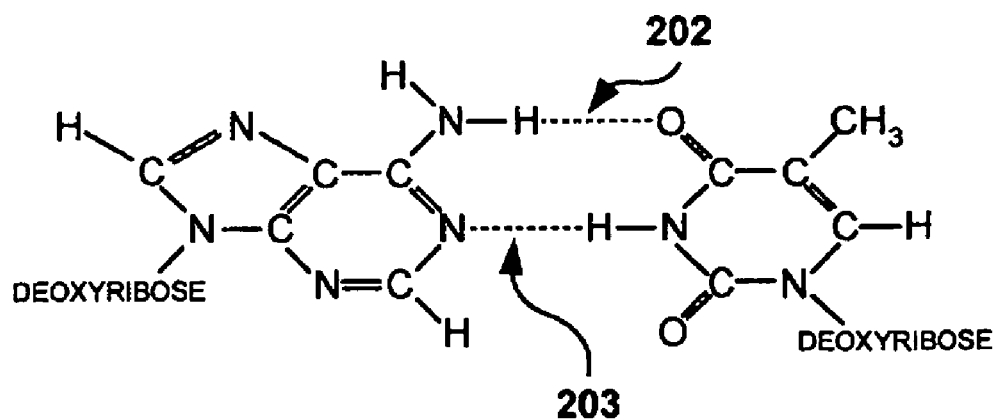
FIGS. 2A-B illustrate the hydrogen bonding between the purine and pyrimidine bases of two anti-parallel DNA strands.
Figure 2B:
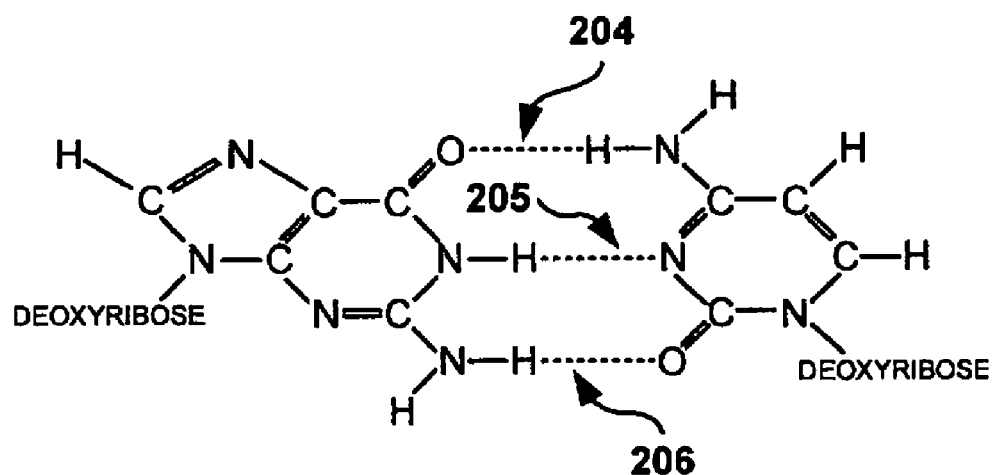
Figure 3:
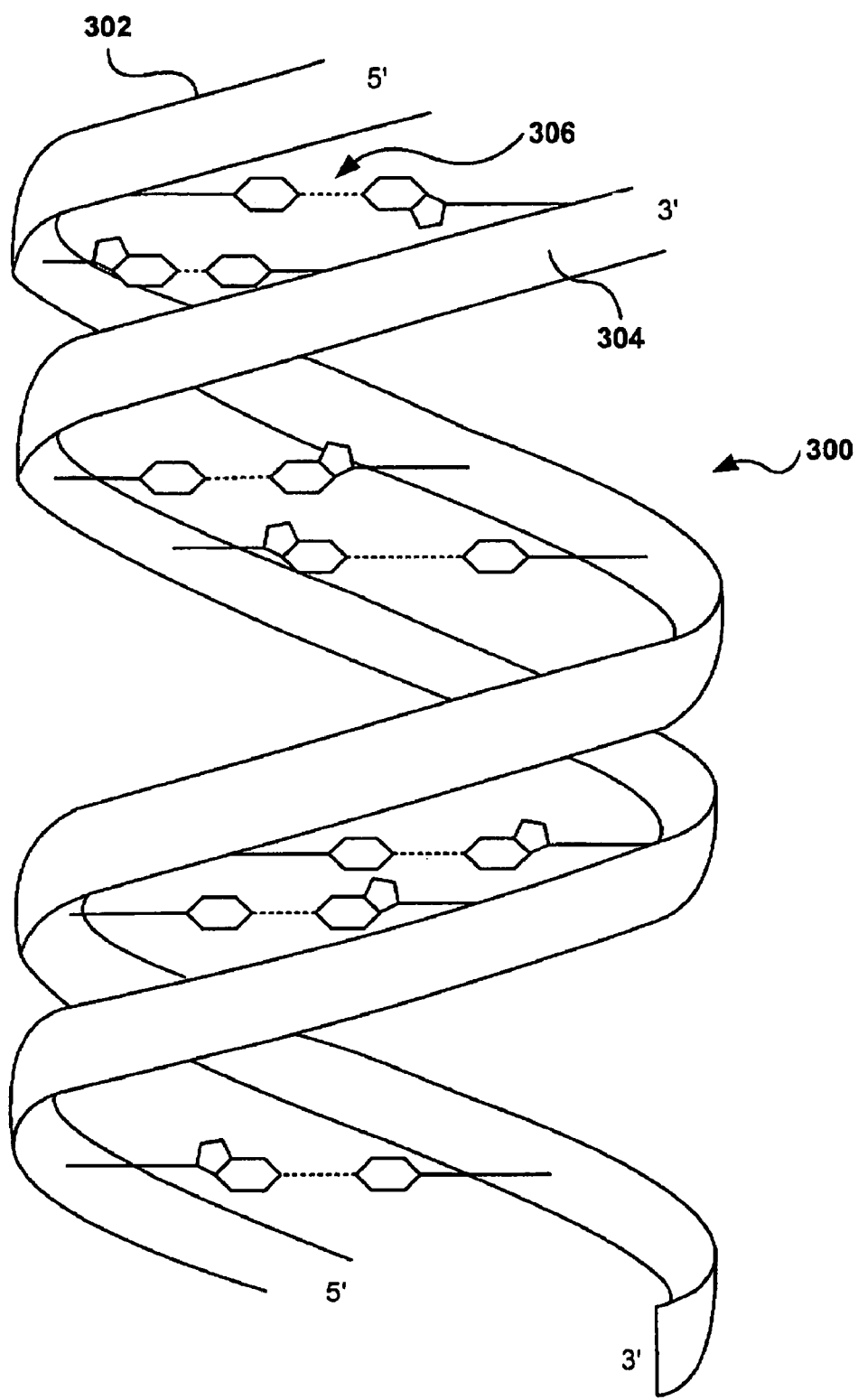
FIG. 3 illustrates a short section of a DNA double helix 300 comprising a first strand 302 and a second, anti-parallel strand 304.
Figure 4:
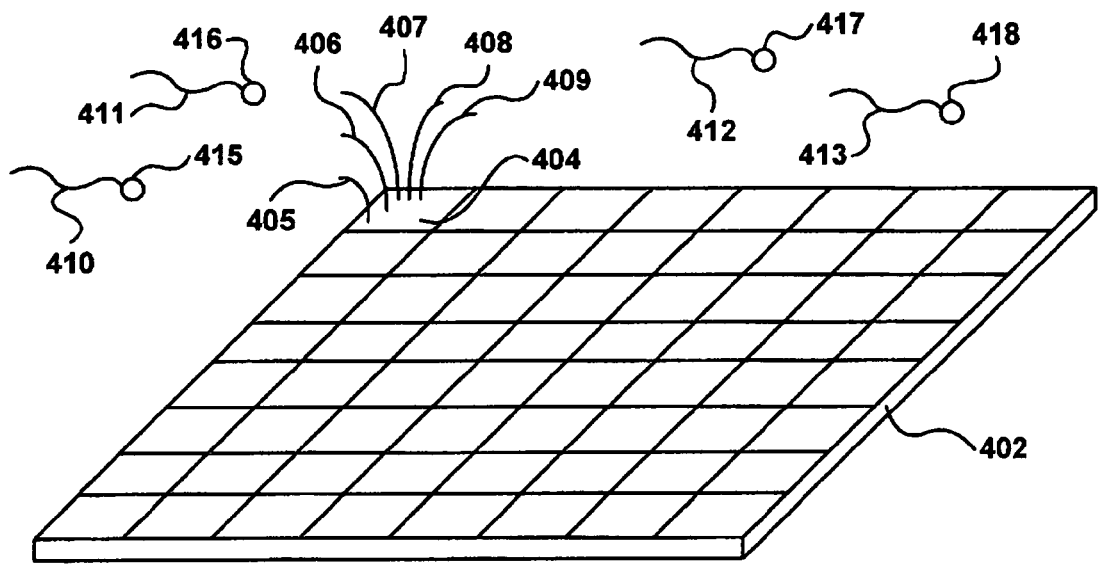
FIGS. 4-7 illustrate the principle of the array-based hybridization assay.
Figure 5:
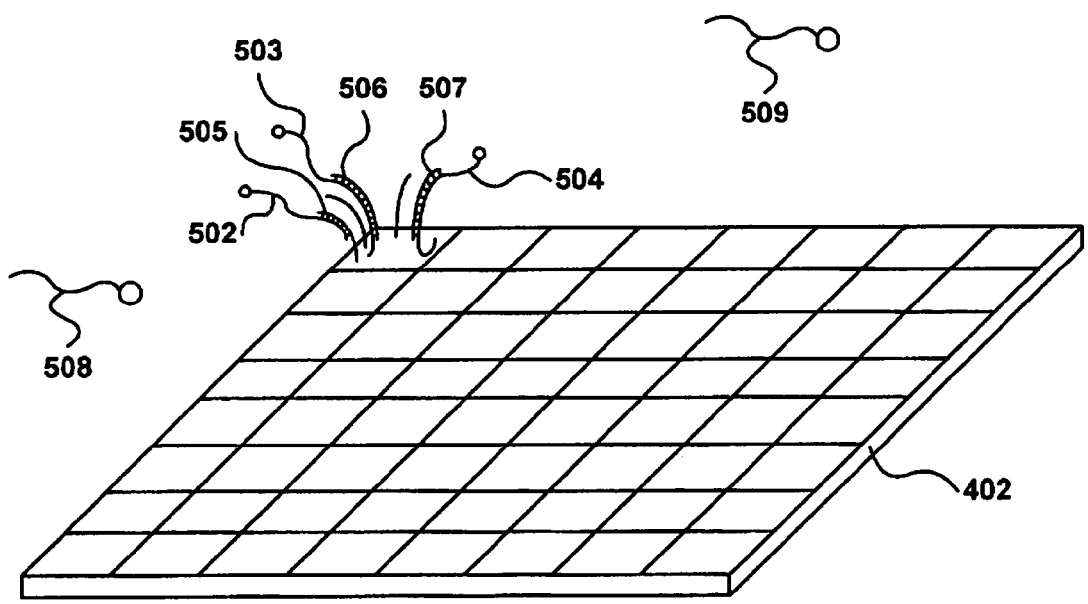
Figure 6:
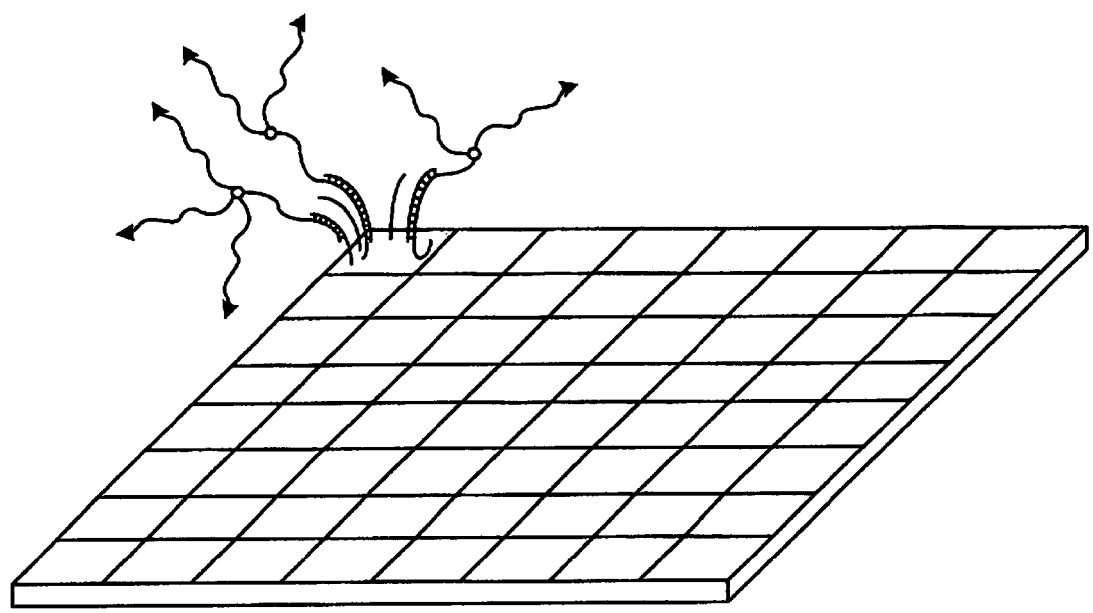
Figure 7:
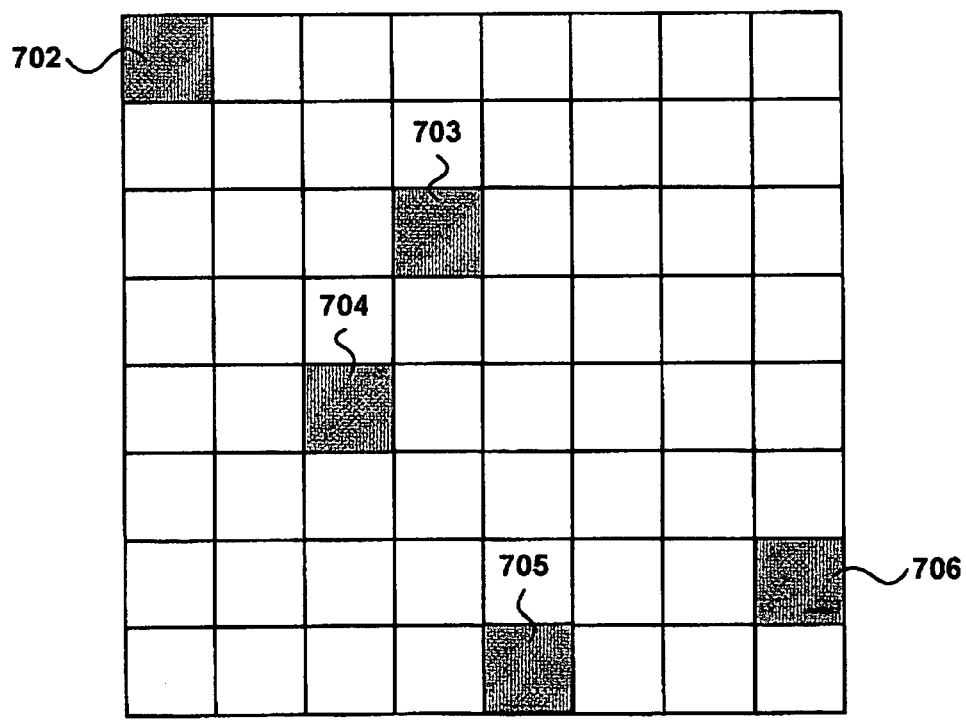
Figure 8A:
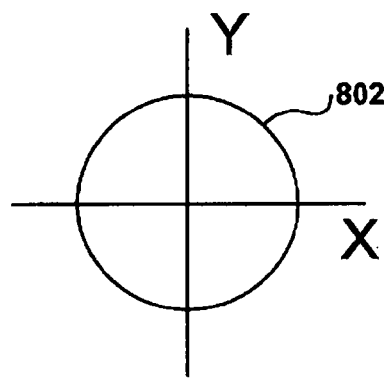
FIGS. 8A-F illustrate a few of the many types of feature irregularities that may occur in a molecular array, and in the pixel-based representation of data scanned from a molecular array.
Figure 8B:
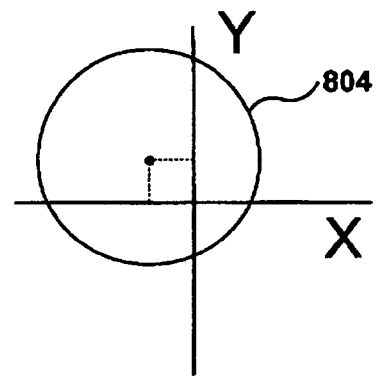
Figure 8C:
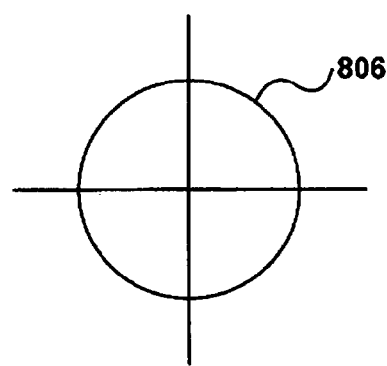
Figure 8D:
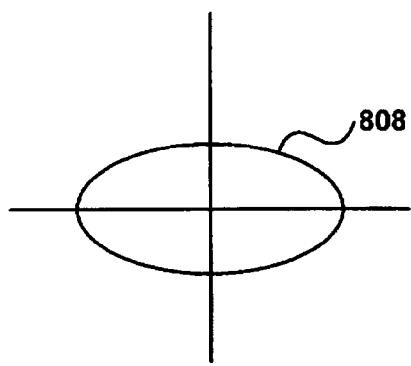
Figure 8E:
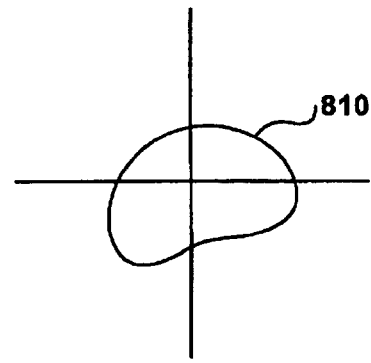
Figure 8F:
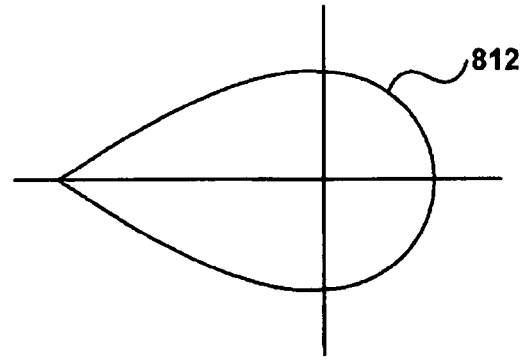
Figure 9:
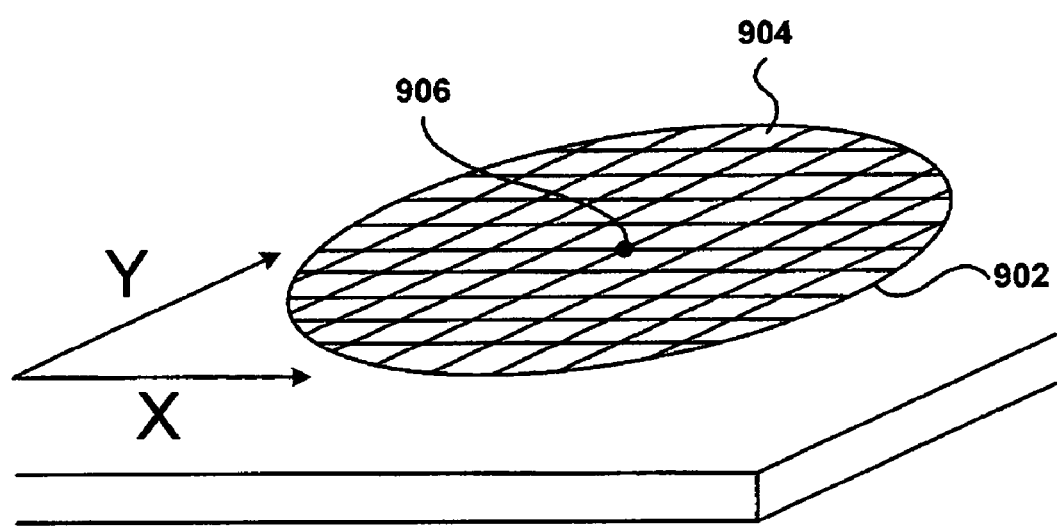
FIGS. 9-10 illustrate a second type of feature-signal irregularity, or non-uniformity, that commonly occurs in the pixel-based representation of data scanned from the surface of a molecular array.
Figure 10:
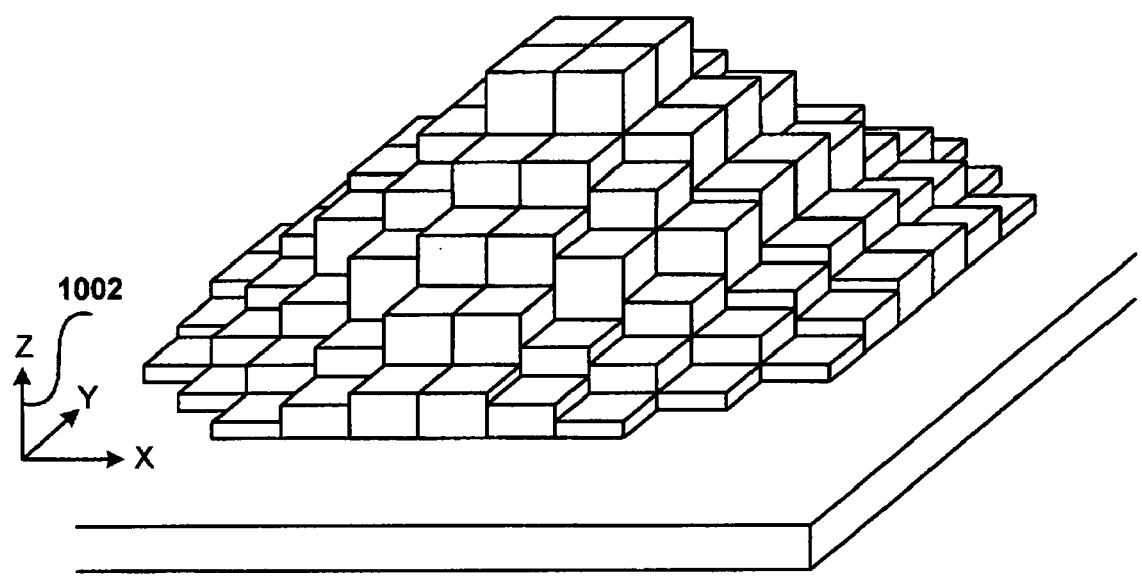

One embodiment of the present invention provides a GUI to allow a data analyst or other microarray user to view pixel intensities corresponding to a feature of a molecular array and to easily and intuitively determine a weighting function to apply to the pixel intensities to properly weight the pixels prior to integration of the pixel intensities to produce a feature signal. In a first subsection, below, addition information about molecular arrays is provided, for the reader unfamiliar with molecular-array technologies. This first subsection can be skipped by those familiar with molecular arrays. A number of embodiments of the present invention are discussed, with reference to FIGS. 11A-18F, in a second subsection. Finally, an implementation of an embodiment of the present invention is included in Appendix A.

Additional Information About Molecular Arrays

An array may include any one-, two- or three-dimensional arrangement of addressable regions, or features, each bearing a particular chemical moiety or moieties, such as biopolymers, associated with that region. Any given array substrate may carry one, two, or four or more arrays disposed on a front surface of the substrate. Depending upon the use, any or all of the arrays may be the same or different from one another and each may contain multiple spots or features. A typical array may contain more than ten, more than one hundred, more than one thousand, more ten thousand features, or even more than one hundred thousand features, in an area of less than 20 cm$^2$ or even less than 10 cm$^2$. For example, square features may have widths, or round feature may have diameters, in the range from a 10 μm to 1.0 cm. In other embodiments each feature may have a width or diameter in the range of 1.0 μm to 1.0 mm, usually 5.0 μm to 500 μm, and more usually 10 μm to 200 μm. Features other than round or square may have area ranges equivalent to that of circular features with the foregoing diameter ranges. At least some, or all, of the features may be of different compositions (for example, when any repeats of each feature composition are excluded the remaining features may account for at least 5%, 10%, or 20% of the total number of features). Interfeature areas are typically, but not necessarily, present. Interfeature areas generally do not carry probe molecules. Such interfeature areas typically are present where the arrays are formed by processes involving drop deposition of reagents, but may not be present when, for example, photolithographic array fabrication processes are used. When present, interfeature areas can be of various sizes and configurations.

Each array may cover an area of less than 100 cm$^2$, or even less than 50 cm$^2$, 10 cm$^2$ or 1 cm$^2$. In many embodiments, the substrate carrying the one or more arrays will be shaped generally as a rectangular solid having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. Other shapes are possible, as well. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, a substrate may transmit at least 20%, or 50% (or even at least 70%, 90%, or 95%), of the illuminating light incident on the front as may be measured across the entire integrated spectrum of such illuminating light or alternatively at 532 nm or 633 nm.

Arrays can be fabricated using drop deposition from pulsejets of either polynucleotide precursor units (such as monomers) in the case of in situ fabrication, or the previously obtained polynucleotide. Such methods are described in detail in, for example, U.S. Pat. No. 6,242,266, U.S. Pat. No. 6,232,072, U.S. Pat. No. 6,180,351, U.S. Pat. No. 6,171,797, U.S. Pat. No. 6,323,043, U.S. patent application Ser. No. 09/302,898 filed Apr. 30, 1999 by Caren et al., and the references cited therein. Other drop deposition methods can be used for fabrication, as previously described herein. Also, instead of drop deposition methods, photolithographic array fabrication methods may be used such as described in U.S. Pat. No. 5,599,695, U.S. Pat. No. 5,753,788, and U.S. Pat. No. 6,329,143. Interfeature areas need not be present particularly when the arrays are made by photolithographic methods as described in those patents.

A molecular array is typically exposed to a sample including labeled target molecules, or, as mentioned above, to a sample including unlabeled target molecules followed by exposure to labeled molecules that bind to unlabeled target molecules bound to the array, and the array is then read. Reading of the array may be accomplished by illuminating the array and reading the location and intensity of resulting fluorescence at multiple regions on each feature of the array. For example, a scanner may be used for this purpose, which is similar to the AGILENT MICROARRAY SCANNER manufactured by Agilent Technologies, Palo Alto, Calif. Other suitable apparatus and methods are described in U.S. patent application Ser. No. 10/087447

"Reading Dry Chemical Arrays Through The Substrate" by Corson et al., and Ser. No. 09/846125 "Reading Multi-Featured Arrays" by Dorsel et al. However, arrays may be read by any other method or apparatus than the foregoing, with other reading methods including other optical techniques, such as detecting chemiluminescent or electroluminescent labels, or electrical techniques, for where each feature is provided with an electrode to detect hybridization at that feature in a manner disclosed in U.S. Pat. No. 6,251,685, U.S. Pat. No. 6,221,583 and elsewhere.

A result obtained from reading an array may be used in that form or may be further processed to generate a result such as that obtained by forming conclusions based on the pattern read from the array, such as whether or not a particular target sequence may have been present in the sample, or whether or not a pattern indicates a particular condition of an organism from which the sample came. A result of the reading, whether further processed or not, may be forwarded, such as by communication, to a remote location if desired, and received there for further use, such as for further processing. When one item is indicated as being remote from another, this is referenced that the two items are at least in different buildings, and may be at least one mile, ten miles, or at least one hundred miles apart. Communicating information references transmitting the data representing that information as electrical signals over a suitable communication channel, for example, over a private or public network. Forwarding an item refers to any means of getting the item from one location to the next, whether by physically transporting that item or, in the case of data, physically transporting a medium carrying the data or communicating the data.

As pointed out above, array-based assays can involve other types of biopolymers, synthetic polymers, and other types of chemical entities. A biopolymer is a polymer of one or more types of repeating units. Biopolymers are typically found in biological systems and particularly include polysaccharides, peptides, and polynucleotides, as well as their analogs such as those compounds composed of, or containing, amino acid analogs or non-amino-acid groups, or nucleotide analogs or non-nucleotide groups. This includes polynucleotides in which the conventional backbone has been replaced with a non-naturally occurring or synthetic backbone, and nucleic acids, or synthetic or naturally occurring nucleic-acid analogs, in which one or more of the conventional bases has been replaced with a natural or synthetic group capable of participating in Watson-Crick-type hydrogen bonding interactions. Polynucleotides include single or multiple-stranded configurations, where one or more of the strands may or may not be completely aligned with another. For example, a biopolymer includes DNA, RNA, oligonucleotides, and PNA and other polynucleotides as described in U.S. Pat. No. 5,948,902 and references cited therein, regardless of the source. An oligonucleotide is a nucleotide multimer of about 10 to 100 nucleotides in length, while a polynucleotide includes a nucleotide multimer having any number of nucleotides.

As an example of a non-nucleic-acid-based molecular array, protein antibodies may be attached to features of the array that would bind to soluble labeled antigens in a sample solution. Many other types of chemical assays may be facilitated by array technologies. For example, polysaccharides, glycoproteins, synthetic copolymers, including block copolymers, biopolymer-like polymers with synthetic or derivitized monomers or monomer linkages, and many other types of chemical or biochemical entities may serve as probe and target molecules for array-based analysis. A fundamental principle upon which arrays are based is that of specific recognition, by probe molecules affixed to the array, of target molecules, whether by sequence-mediated binding affinities, binding affinities based on conformational or topological properties of probe and target molecules, or binding affinities based on spatial distribution of electrical charge on the surfaces of target and probe molecules.

Scanning of a molecular array by an optical scanning device or radiometric scanning device generally produces a scanned image comprising a rectilinear grid of pixels, with each pixel having a corresponding signal intensity. These signal intensities are processed by an array-data-processing program that analyzes data scanned from an array to produce experimental or diagnostic results which are stored in a computer-readable medium, transferred to an intercommunicating entity via electronic signals, printed in a human-readable format, or otherwise made available for further use. Molecular array experiments can indicate precise gene-expression responses of organisms to drugs, other chemical and biological substances, environmental factors, and other effects. Molecular array experiments can also be used to diagnose disease, for gene sequencing, and for analytical chemistry. Processing of molecular-array data can produce detailed chemical and biological analyses, disease diagnoses, and other information that can be stored in a computer-readable medium, transferred to an intercommunicating entity via electronic signals, printed in a human-readable format, or otherwise made available for further use.

One Embodiment of the Present Invention

Figure 11A:
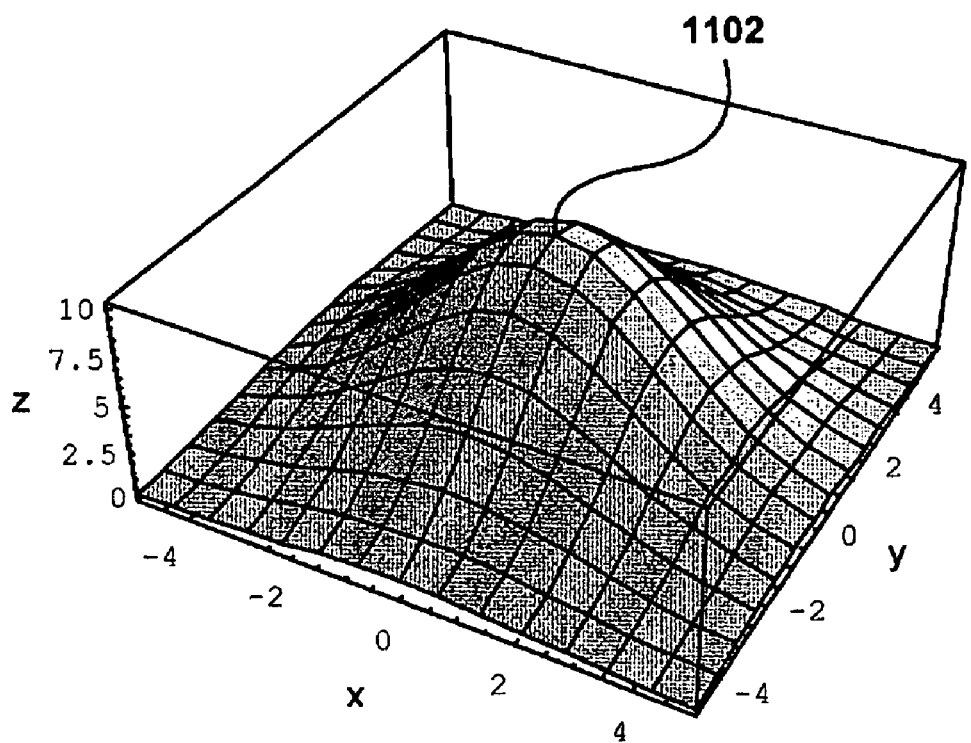
FIG. 11A illustrates a hypothetical distribution of pixel intensities over a rectangular region of a surface of a molecular array corresponding to a feature.

FIG. 11A illustrates a hypothetical distribution of pixel intensities over a rectangular region of a surface of a molecular array corresponding to a feature. Note that, in FIG. 11 and in figures to follow, only a small number of pixels are illustrated within the region of a molecular array containing a feature. In actual practice, the region of a pixel-based representation of the data collected from a feature of a molecular array may contain many thousands of pixels. As shown in FIG. 11A, the pixel intensity is non-uniformly distributed, rising to a peak intensity at the center of the feature 1102 and falling off dramatically towards the edges of the illustrated region. Although not readily apparent on inspection, the pixel-intensity distribution for this particular feature may be modeled by a two-variable surface equation, such as:

$$z = 10 e^{-\frac{x^2}{10}} e^{-\frac{y^2}{10}}$$

Figure 11B:
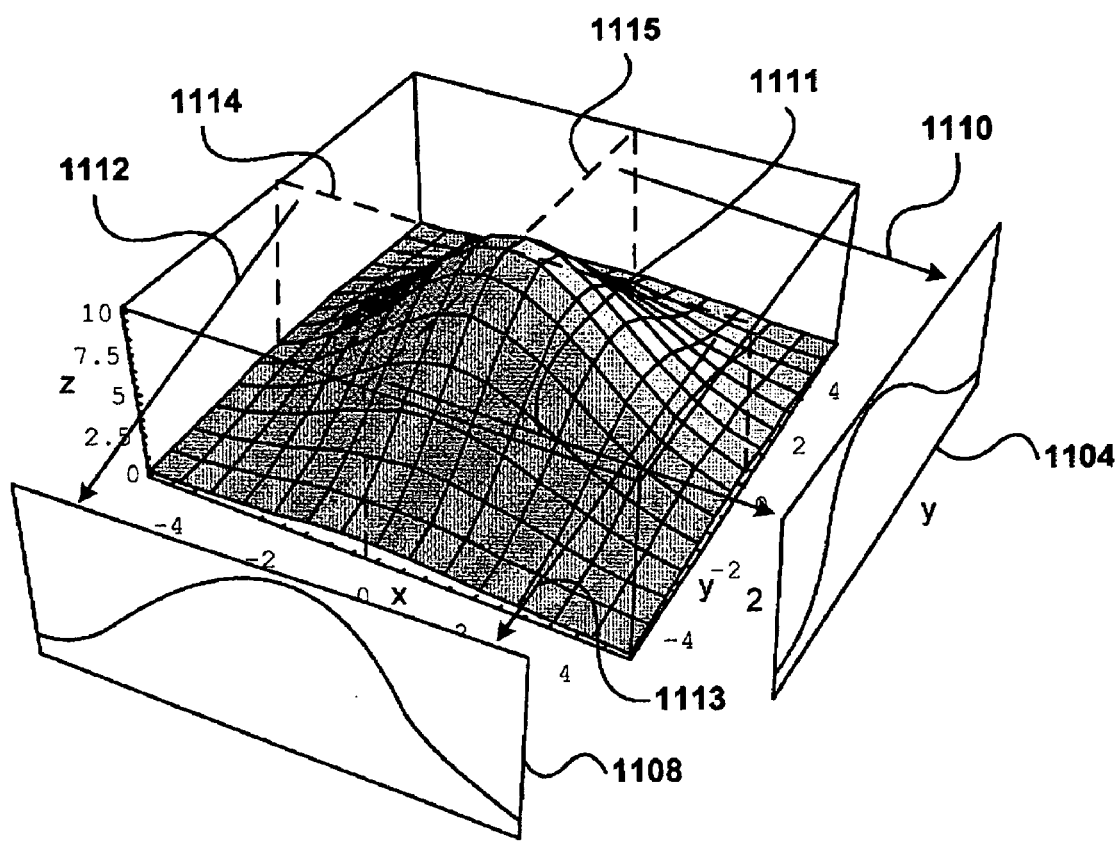
FIG. 11B shows the same pixel-intensity distribution as shown in FIG. 11A, along with two cross-sections.

FIG. 11B shows the same pixel-intensity distribution as shown in FIG. 11A, along with two cross-sections. The first cross-section, 1104, is a two-dimentional graph of the pixel-intensity distribution in a vertical plane oriented normal to the x direction and passing through the origin 1106. This cross-section may be referred to as a yz slice. The second cross-section, 1108, or xz slice, is a two-dimensional representation of the pixel-intensity distribution in a cross-section normal to the y direction passing through the origin. The arrows 1110-1113 in FIG. 11B are meant to indicate that the displayed cross-sections are offset, for display purposes, from their positions within the pixel-intensity distribution indicated by dashed lines 1114-1115. The yz and xz slices for various distributions and weighting functions are shown in subsequent figures, without further comment. Note that the yz and xz slices can greatly facilitate the analysis, by a human user, of the surface-contour-like pixel-intensity distributions and the pixel-intensity weighting functions that may be applied to the pixel intensities within a region of a molecular array corresponding to a feature.

Figure 12:
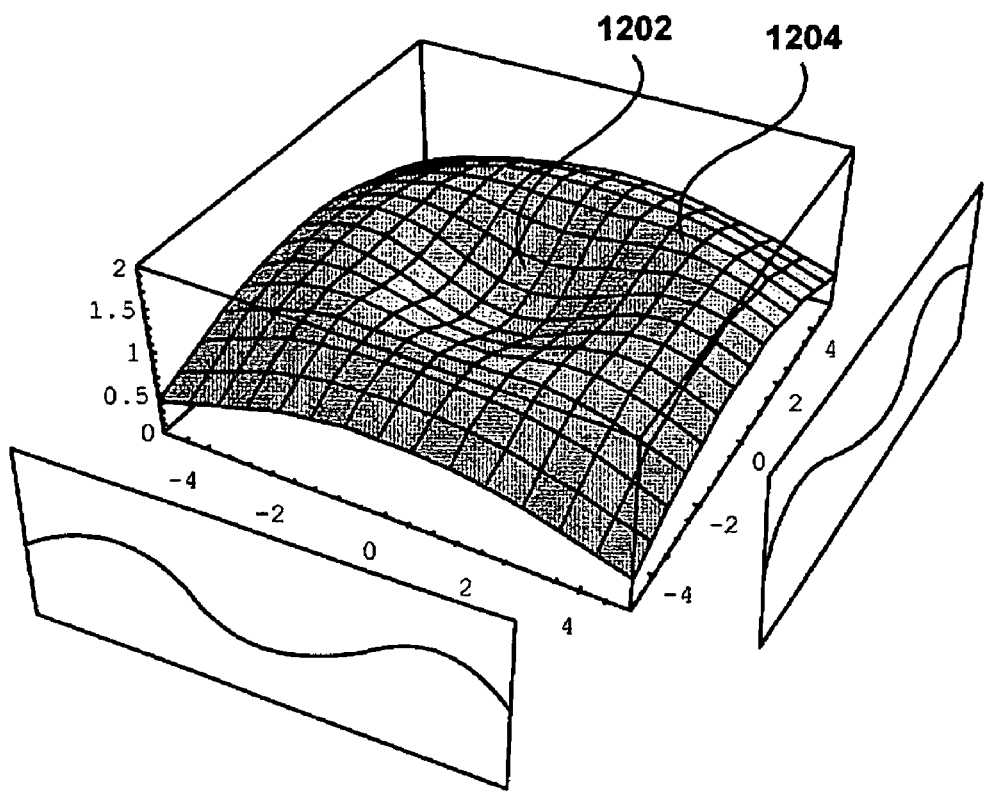
FIG. 12 illustrates a weighting function that might be applied in order to achieve a de-emphasis of central-pixel intensities.

An analyst, or molecular-array user, viewing a pixel-intensity distribution as shown in FIG. 11A, may choose to apply one of various weighting functions to the pixel intensities in order to weight the pixel intensities prior to integration of pixel intensities over the region of interest of a feature to produce a feature signal. For example, it may be known to the analyst, or molecular-array user, that, because of an expected distribution of probe molecules within the feature, a non-linear process related to the density of probe molecules and corresponding density of target molecules bound to the probe molecules creates artificially high signal intensities in the central portion of the feature. In this case, the analyst or molecular-array user may choose to apply a weighting function to the raw pixel intensities in order to decrease the significance of central-pixel intensities prior to integration of the pixel intensities to produce a feature signal. FIG. 12 illustrates a weighting function that might be applied in order to achieve a de-emphasis of central-pixel intensities. Note that the weighting function illustrated in FIG. 12 has a central depression 1202 within an annular ridge 1204 of maximum weights designed to give greatest weight to intermediate-intensity pixels inhabiting the shoulders of the pixel-intensity distribution shown in FIG. 11A. An expression for this weighting function is provided below:

$$z = 3.15\left[e^{-\frac{x^2}{25}}e^{-\frac{y^2}{25}} - \frac{1}{1.25}e^{-\frac{x^2}{10}}e^{-\frac{y^2}{10}}\right]$$

Figure 13:
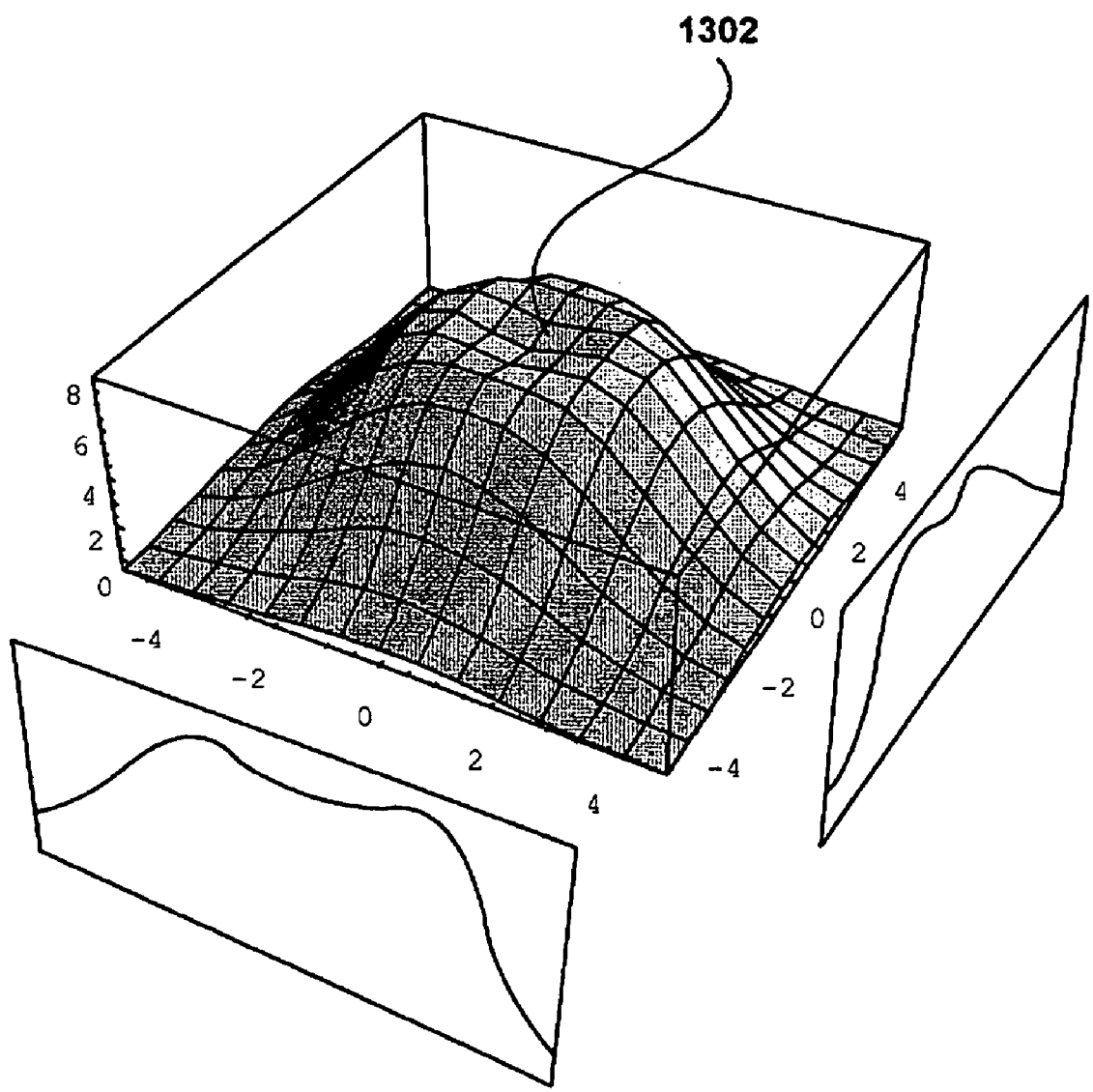
FIG. 13 is a surface-contour plot of weighted pixel intensities following multiplication of the original raw pixel intensities by the weighting function, illustrated in FIG. 12.

The analyst may then apply the weighting function to the raw pixel intensities to produce weighted pixel intensities. FIG. 13 is a surface-contour plot of the weighted pixel intensities following multiplication of the original raw pixel intensities by the weighting function, provided above. Note that the weighted pixel intensities show a slight central depression 1302 that can be seen, by comparison to the unweighted pixel distribution shown in FIG. 11A, to represent a de-emphasization of the central pixel intensities of the feature. Thus, the analyst or other molecular-array user, by applying the weighting function, has selected for greatest emphasis those pixel intensities surrounding a central, disk-shaped region of the feature. Of course, the analyst or other molecular-array user has chosen this weighting function based on particular information about the distribution of target molecules bound to the molecular array. Current molecular-array feature extraction software and data processing software do not conveniently provide for such particularized, array-specific or experiment-specific information to be taken into account during feature signal extraction.

Figure 14:
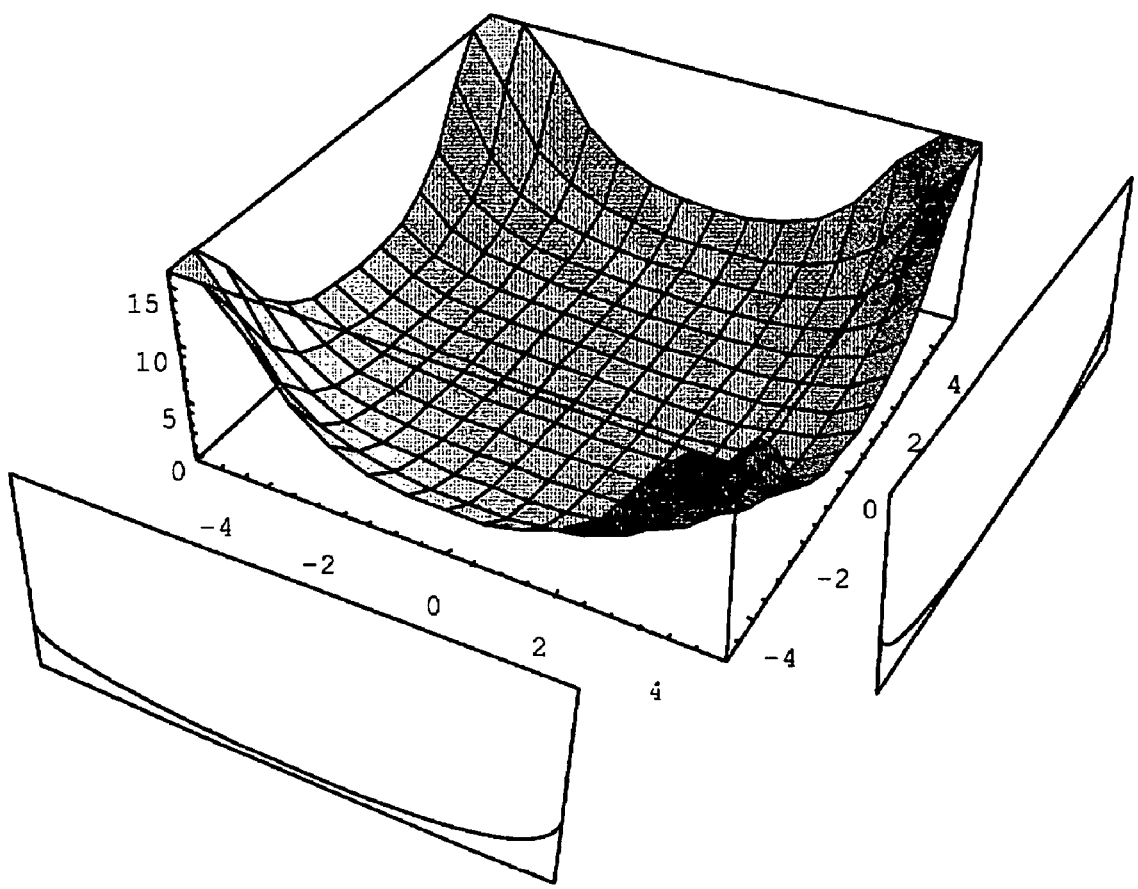
FIG. 14 shows a weighting function that might be chosen to produce a uniform, level pixel-intensity surface across the entire region of a feature.

As in another example, the analyst or molecular-array user may instead choose to more highly weight the non-central pixel intensities in the pixel-intensity distribution shown in FIG. 11A. For example, the molecular-array user may know, based on chemical and experimental knowledge, that the particular type of molecular array, when exposed to particular types of target molecules, invariably produces a pixel-intensity distribution of the type shown in FIG. 11A. Therefore, the analyst or other molecular-array user may choose to normalize the pixel intensities across the entire region of the feature based on the well-known raw pixel-intensity distribution. FIG. 14 shows a weighting function that might be chosen to produce a uniform, level pixel-intensity surface across the entire region of the feature. The analytical expression of this weighting function is provided below:

$$z = \frac{3}{10}e^{\frac{x^2}{10}}e^{\frac{y^2}{10}}$$

Figure 15:
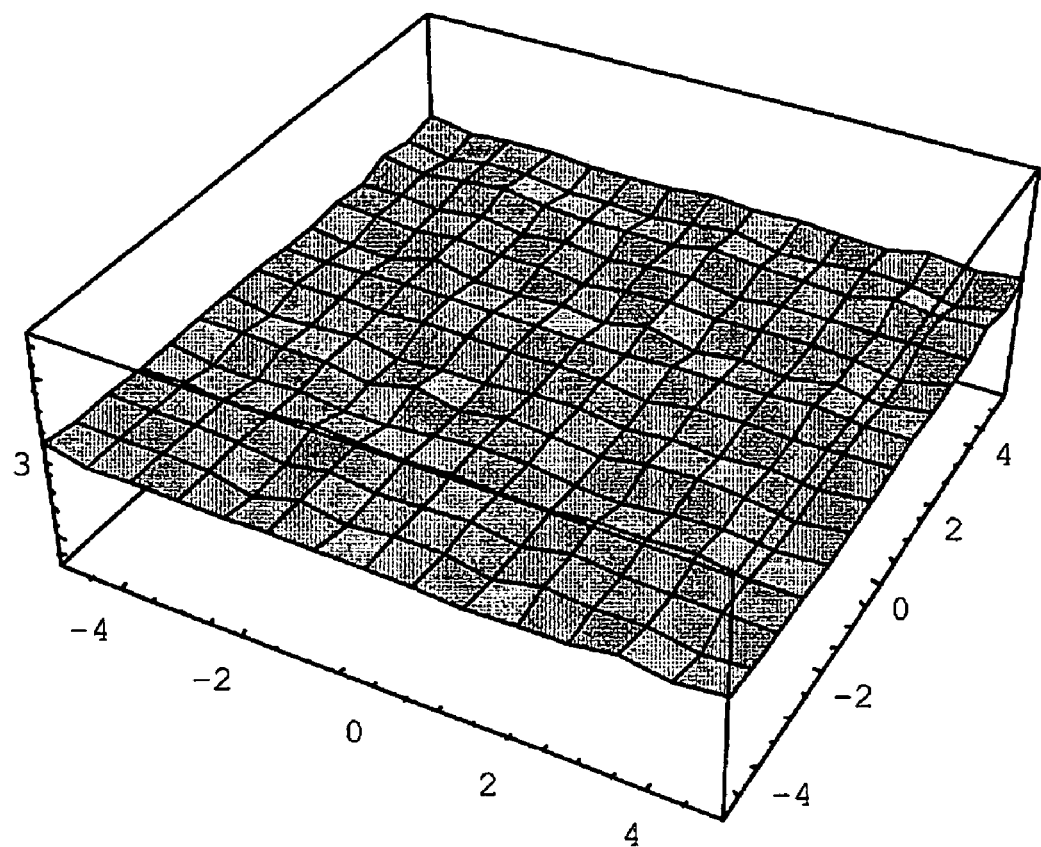
FIG. 15 shows the resulting uniform pixel-intensity distribution resulting from applying the weighting function illustrated in FIG. 14 to the pixel intensity distribution shown in FIG. 11A.

When the weighting function illustrated in FIG. 14 is applied to the raw pixel intensities, a resulting level pixel-intensity distribution results. FIG. 15 shows the resulting uniform pixel-intensity distribution resulting from applying the weighting function illustrated in FIG. 14 to the pixel intensity distribution shown in FIG. 11A. Note that this result is expected mathematically, as shown below:

$$z = \left[10e^{-\frac{x^2}{10}}e^{-\frac{y^2}{10}}\right]\left[\frac{3}{10}e^{\frac{x^2}{10}}e^{\frac{y^2}{10}}\right] = 3$$

Again, there is no a priori reason to assume that either of the two weighting functions shown in FIGS. 12 and 14 might be useful or advantageous from the perspective of an analyst or other molecular-array user. However, it is desirable for the analyst or molecular-array user to be able to furnish such weighting functions, based on knowledge of the molecular-array, experimental procedures to which the molecular array was subjected, and the chemistries of the probe and target molecules, to feature extraction software for application to raw pixel intensities prior to integration of pixel intensities to produce feature signals.

Figure 16:
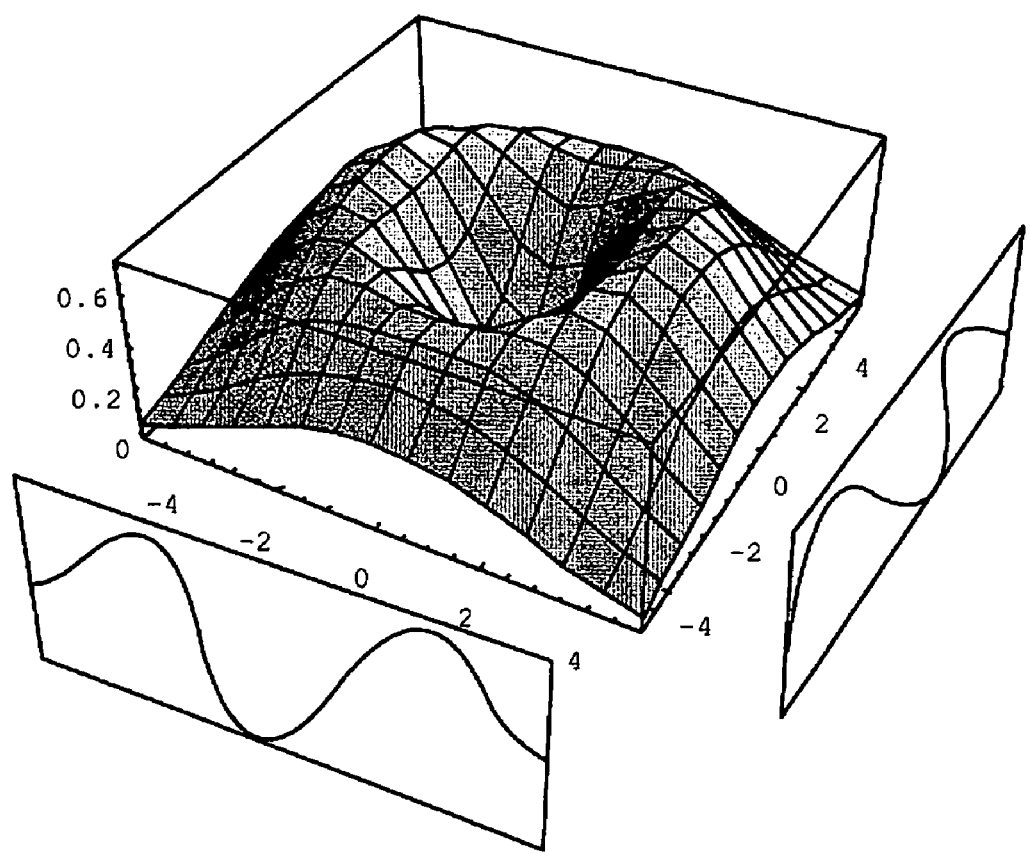
FIGS. 16-18 illustrate a second example of a weighting function applied to a pixel-intensity distribution.
Figure 17:
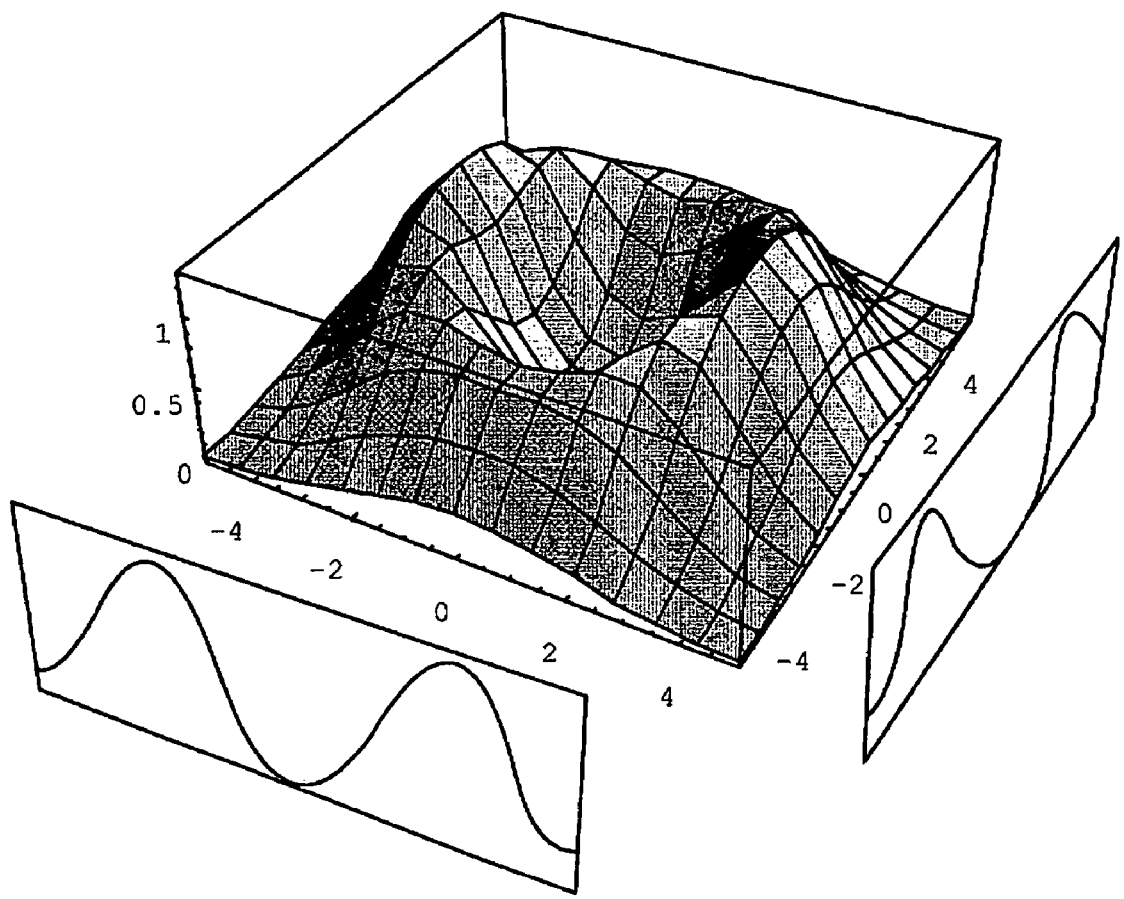
Figure 18:
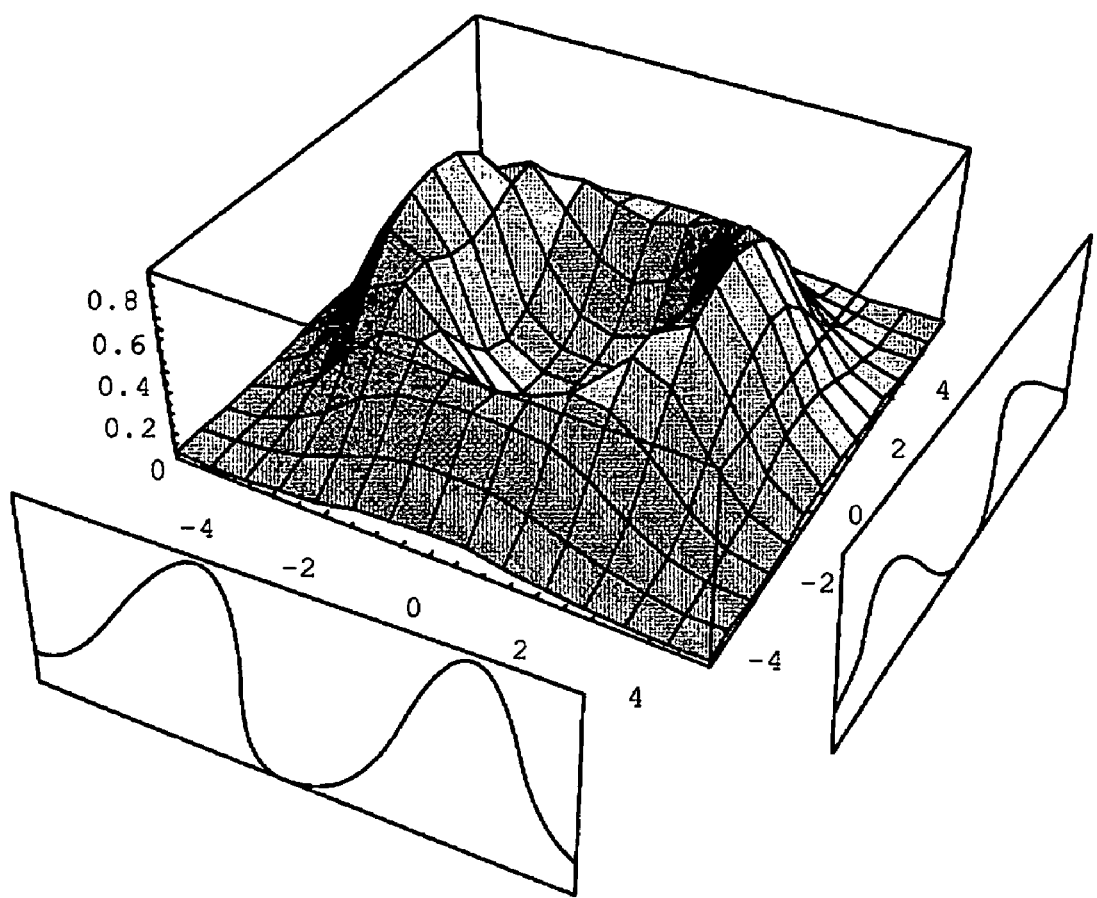

FIGS. 16-18 illustrate a second example. In this example, as shown in FIG. 16, the raw pixel intensities are distributed in an annular fashion around the center of the feature-containing region. This raw pixel-intensity distribution may be modeled with the following expression:

$$z = 5\left[e^{-\frac{x^2}{10}}e^{-\frac{y^2}{12}} - e^{-\frac{x^2}{7}}e^{-\frac{y^2}{9}}\right]$$

In this case, an analyst may choose to particularly emphasize those high-intensity pixels within the annular region, and may thus choose the weighting function illustrated in FIG. 17 and expressed, as follows:

$$z = 75\left[e^{-\frac{x^2}{10}}e^{-\frac{y^2}{12}} - e^{-\frac{x^2}{7}}e^{-\frac{y^2}{9}}\right]^2$$

When this waiting function is used to multiply the raw-pixel intensities, a weighted pixel-intensity distribution, with a sharper annular ridge that more particularly emphasizes the highest-intensity pixels, results. FIG. 18 shows the distribution of weighted pixel intensities following application of the weighting function illustrated in FIG. 17 to the raw pixel-intensity distribution shown on FIG. 16. The final weighted pixel-intensity distribution may be modeled by the expression:

$$z = 375\left[e^{-\frac{x^2}{10}}e^{-\frac{y^2}{12}} - e^{-\frac{x^2}{7}}e^{-\frac{y^2}{9}}\right]^3$$

Figure 19A:
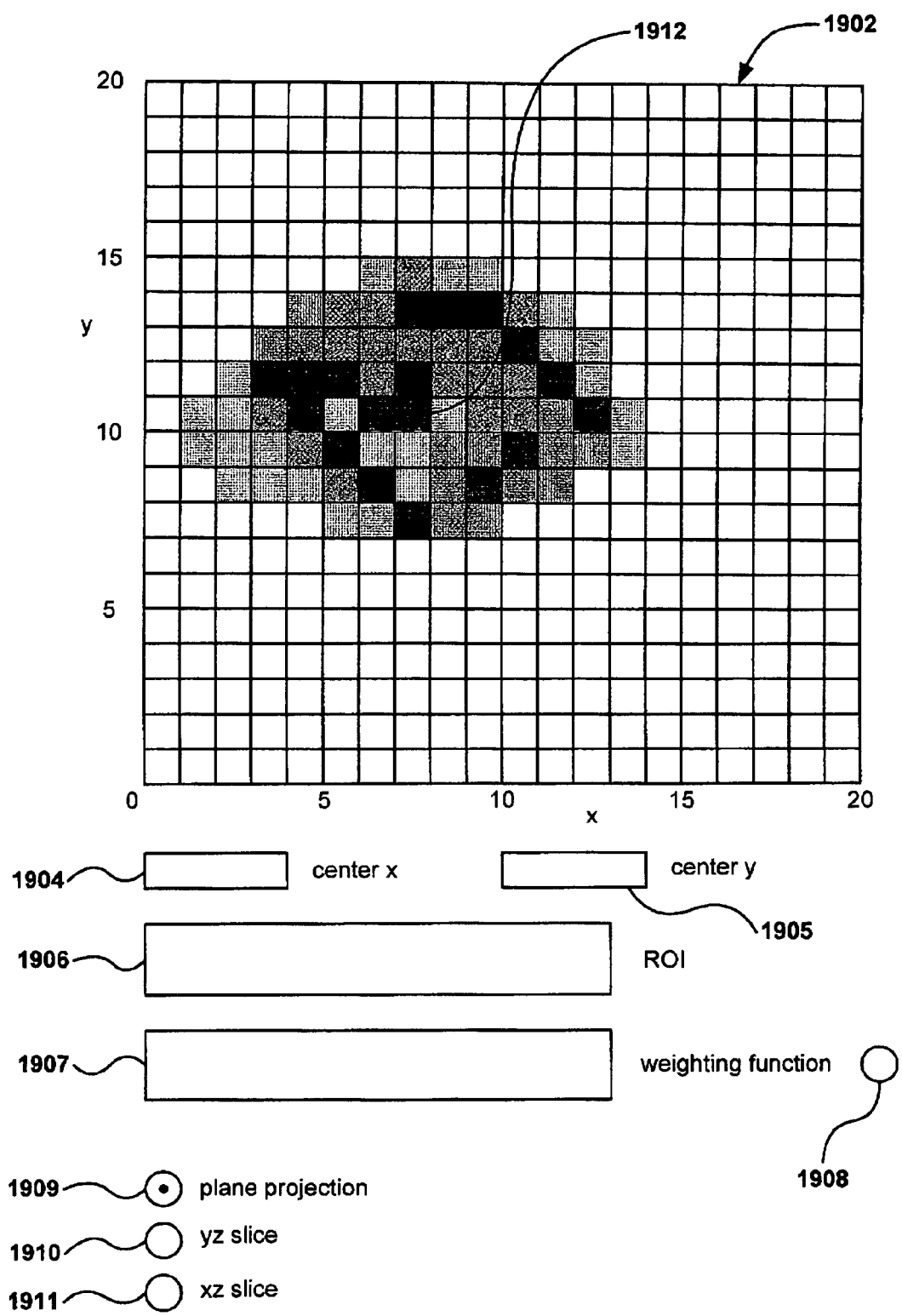
FIGS. 19A-H illustrate a GUI, and manipulation of the GUI with respect to a particular example, that represents one embodiment of the present invention.
Figure 19B:
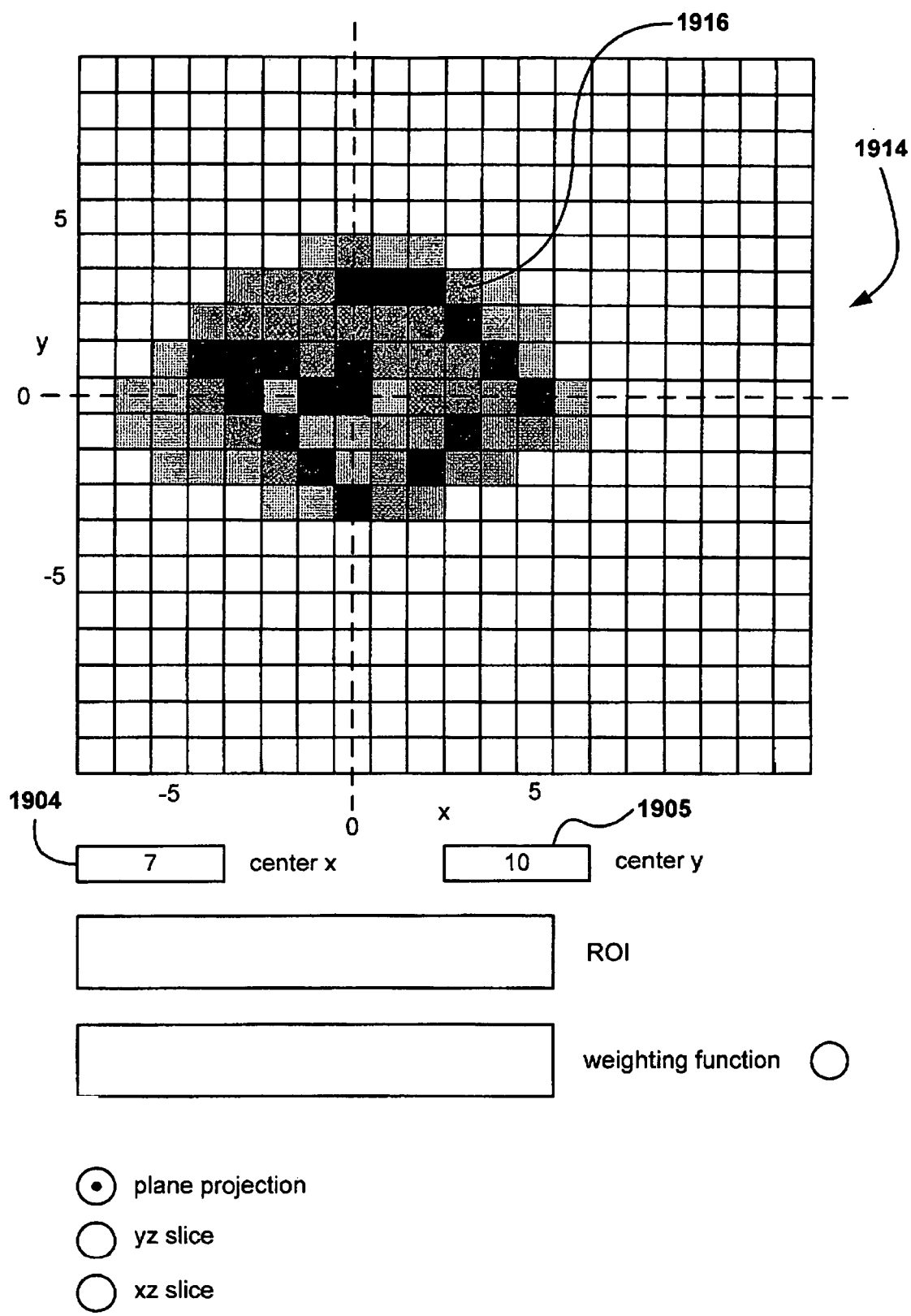

One embodiment of the present invention is a GUI that provides an analyst or other molecular-array user with an ability to simply and intuitively determine and apply any of an almost limitless number of different weighting functions to the raw pixel-intensity distribution corresponding to any particular feature within a pixel-based representation of data scanned from a region of the surface of a molecular array corresponding to the feature. FIGS. 19A-H illustrate a GUI, and manipulation of the GUI with respect to a particular example, that represents one embodiment of the present invention. This GUI embodiment is intended to be embodied within a feature extraction and molecular-array-data-analysis program. An initial state of the GUI is shown in FIG. 19A. The GUI includes a gray scale or color-coded, plane-projection representation of the pixel intensities in a region of the pixel-based representation of pixel intensities of a molecular array 1902. The GUI also includes four data entry windows 1904-1907 that allow an analyst or other molecular-array user to input the coordinates for the origin of a feature-specific rectilinear coordinate system, an expression for the region of interest relative to that coordinate system, and a weighting function relative to that coordinate system. The GUI further includes radio buttons or other on/off input selection tools 1908-1911 that allow the analyst or user to select various types of display of pixel intensity and weighting function distributions in the display area that initially displays the plane-projection of raw pixel intensities 1902.

As a first step, an analyst may enter, into text input windows 1904 and 1905, the xy coordinates, relative to the initially displayed rectilinear coordinate system (1902 and FIG. 19A), for an origin of a feature-specific coordinate system. An example shown in FIG. 19B, the analyst has chosen, as the origin for the feature-specific coordinate system, the pixel originally displayed at position (7,10) (1912 and FIG. 19A). Note that a new, feature-specific rectilinear coordinate system 1914 is now displayed over the gray scale or color-coded representation of pixel intensities, such as the gray scale-coded intensity for pixel 1916.

In a second step, the user may input, into text-input window 1906, a mathematical expression for the region of interest over which pixel intensities are to be integrated. In this case, the user has input a mathematica-like expression for the mathematical expression provided below:

$$y = \pm \sqrt{16 - \frac{8}{18}x^2}$$

This expression selects the region inside of the ellipse 1918 as a region of interest. A simple mathematica-like expression parser is employed to parse the input expressions in order to generate the identities of the pixels within the region of interest. Note that the border of the region of interest is displayed as ellipse 1918 in the plane-projection display 1914. The user may alternatively view the raw pixel-intensity distribution as two-dimensional cross-sections. In FIG. 19D, for example, the user has input a selection input, such as a mouse click, to radio button 1910 in order to view the yz slice 1920 corresponding to the raw pixel-intensity distribution, and in FIG. 19E, the user has input a selection input to radio button 1911 in order to view the xz slice 1922 of the raw pixel-intensity distribution.

In the next step, the user may input a mathematica-like expression into text input window 1907 in order to specify a weighting function to be applied to the raw pixel-intensity distribution. The GUI parses the input weighting function and generates a computer-readable representation of the weighting function for application to pixel intensities. Note that the user has also input a selection input to radio button 1908 to select display of the weighting function, rather than the raw pixel intensities, and the xz slice 1924 of the weighting function is correspondingly displayed to the user. As shown in FIG. 19G, the user may alternatively select display of the yz slice 1926. Finally, the user may input a selection input to radio button 1908 in order to turn off display of the weighting function, resulting in display of the pixel intensities weighted by the input weighting function. Alternate embodiments may provide for graphical input of weighting functions by, for example, allowing a user to trace the contour of a weighting function in several two-dimensional cross-sections. In certain embodiments, a user may choose to initially enter a weighting function as a symbolic equation, and then to alter the weigting function by using mouse input to alter the shape of displayed representations of the weighting function.

Figure 19C:
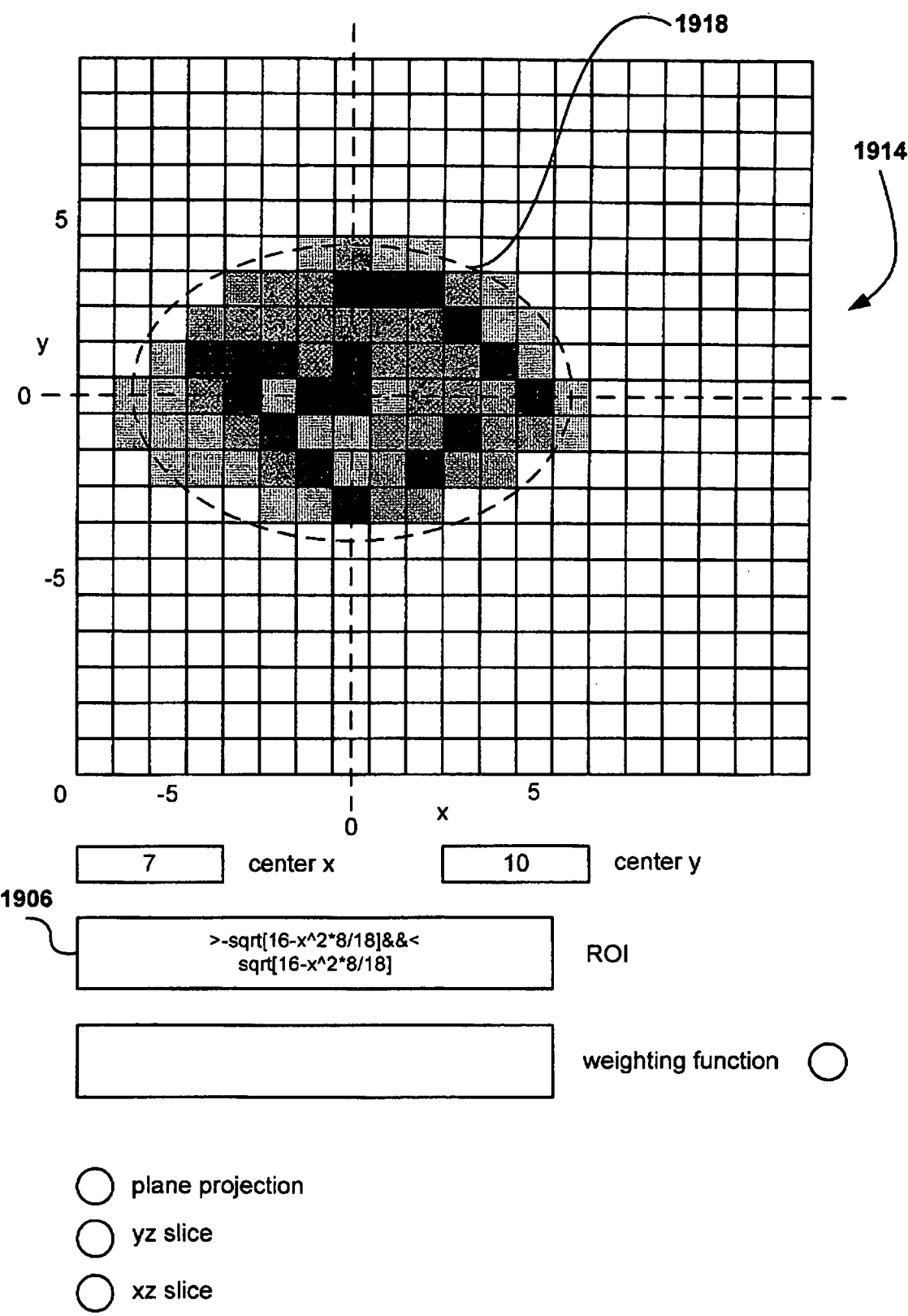
Figure 19D:
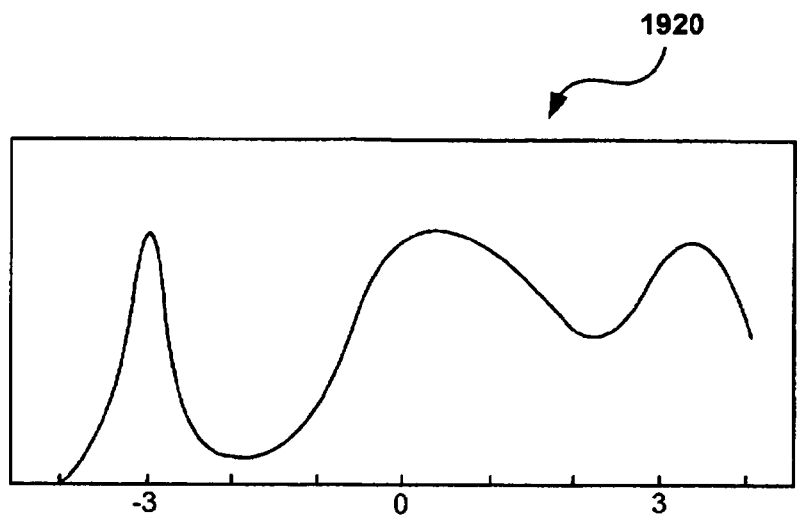
Figure 19D:
Figure 19E:
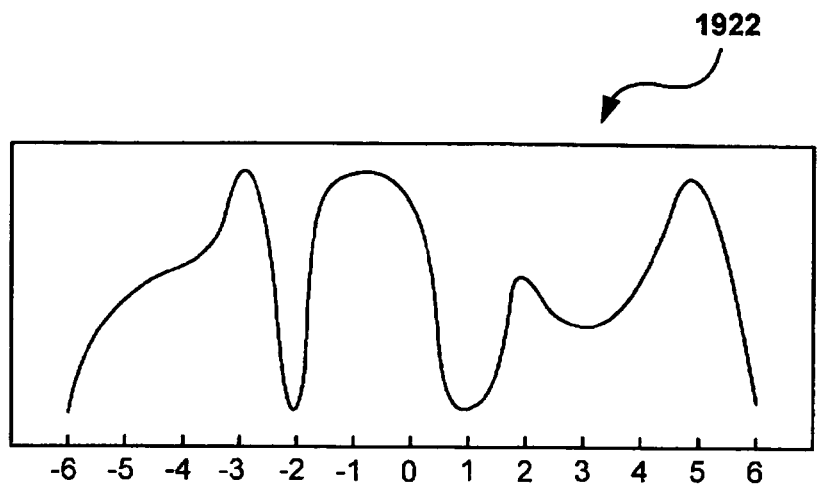
Figure 19E:
Figure 19E:
Figure 19E:
Figure 19E:
Figure 19F:
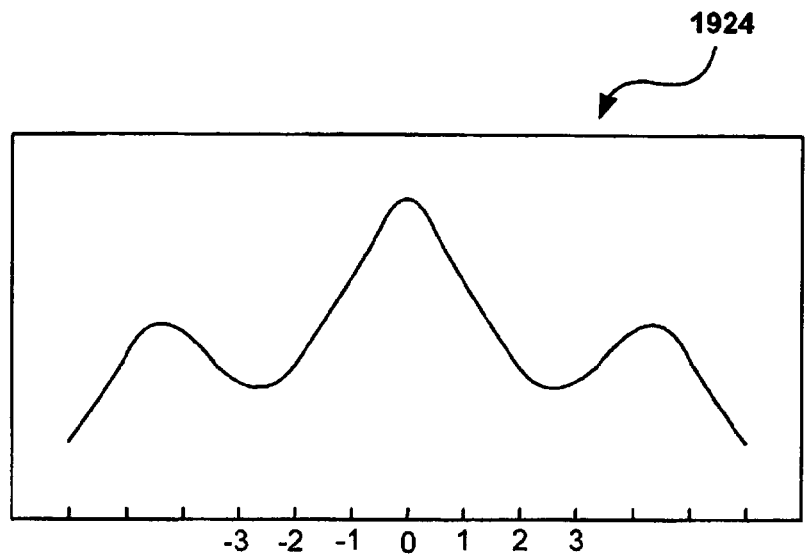
Figure 19G:
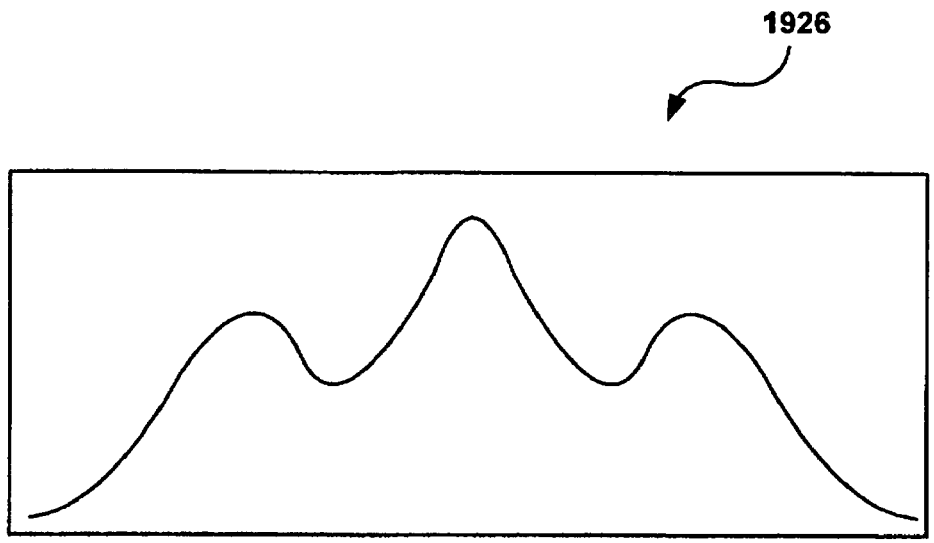
Figure 19G:
Figure 19H:
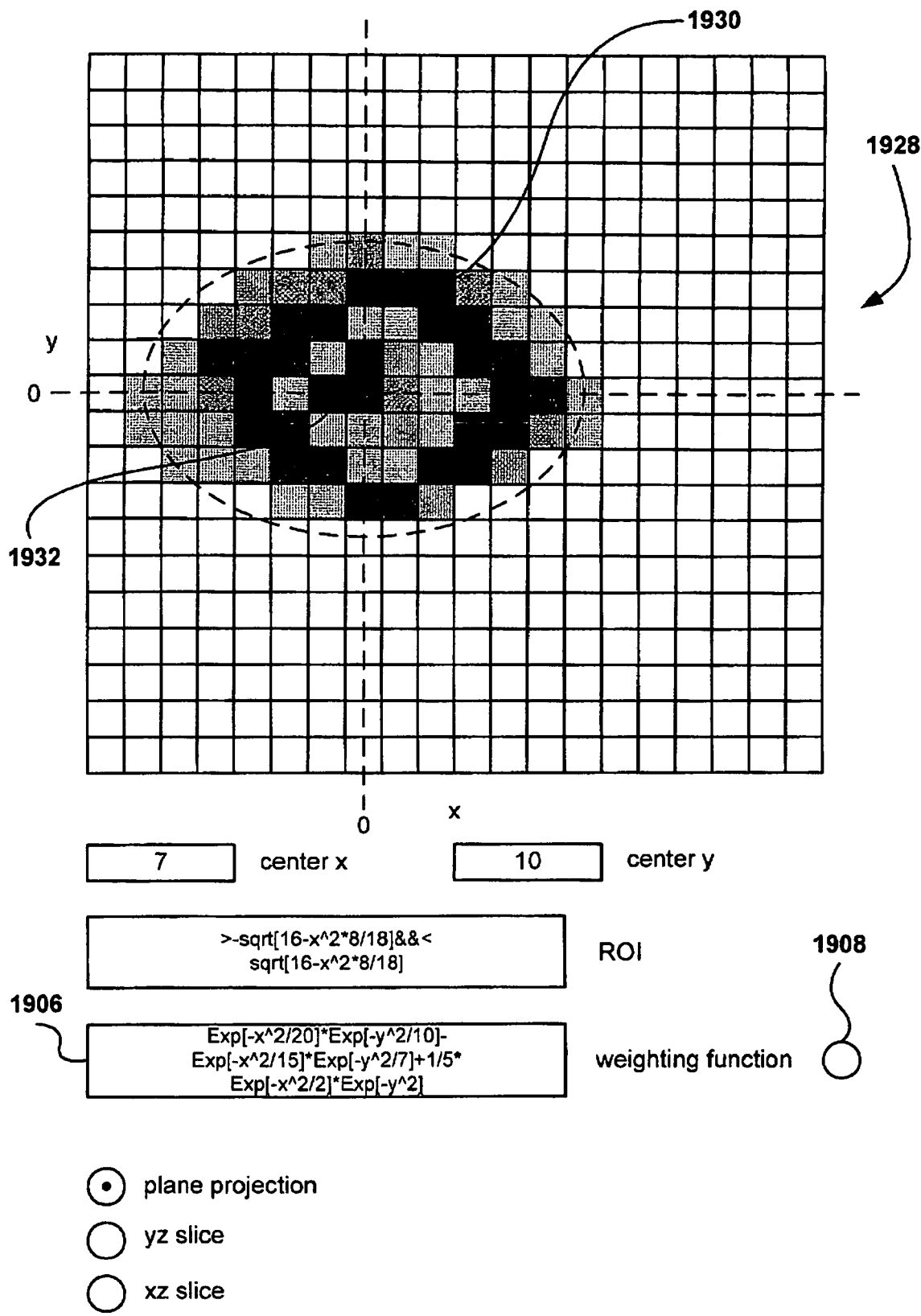

Comparing the gray scale-encoded weighted pixel intensities 1928 in the FIG. 19H to the raw pixel intensities 1914 in FIG. 19C, it is seen that by selecting the weighting function input to input-text window 1906, the analyst has chose to emphasize those pixels within an annular region 1930 of the feature and also within the central disk 1932 of the feature. Note that the weighting function input in input text window 1906 can be expressed as follows:

$$z = e^{-\frac{x^2}{20}} e^{-\frac{y^2}{10}} - e^{-\frac{x^2}{15}} e^{-\frac{y^2}{7}} + \frac{1}{5} e^{-\frac{x^2}{2}} e^{-y^2}$$

Although the present invention has been described in terms of a particular embodiment, it is not intended that the invention be limited to this embodiment. Modifications within the spirit of the invention will be apparent to those skilled in the art. For example, any of an almost limitless number of mathematical expression languages can be used to input region of interest boundaries and weighting functions. In the described example, a mathematica-like expression was used, but any of the popular expression-input paradigms could be substituted for that, including, for example, a graphical scientific calculator with buttons that could be pushed to build a mathematical expression into the input window. In addition, the GUI can be enhanced to provide the ability to the user to store and retrieve functions from a library of weighting functions and region of interest expressions. Alternative types of display can be provided, including contour displays, such as the contour displays shown in FIGS. 11A-11B. Additional input windows can be provided to allow the user to alter the gray scale coding and color coding, dimensions of the displayed area, and other such parameters. In addition, the user may be allowed to select automated pixel-intensity density centering, rather than specifying the origin of the feature-specific coordinate system, and a threshholding filter may be applied to automatically generate the region of interest. As noted above, alternate embodiments may substitute purely graphical interfaces to allow for user input, or combine graphical input with symbolic-expression input, to increase the ease by which a user may enter and manipulate weighting functions.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for processing pixel-intensity data scanned from a microarray, the method comprising:
    displaying a representation of a pixel intensity distribution to a user;
    soliciting from the user a weighting function through a graphical user interface; and
    applying the weighting function to the pixel-intensity data, generating a new representation of the modified pixel intensity distribution to display to the user.

2. The method of claim 1 wherein soliciting from the user a weighting function through a graphical user interface further includes receiving a symbolic representation of the weighting function input by the user to a pixel-intensity weighting function input device.

3. The method of claim 1 further including displaying representations of the weighting function to the user.

4. The method of claim 1 wherein the pixel-intensity weighting function input device is a text-input window that allows the user to symbolically enter a weighting function.

5. The method of claim 1 further comprising:
    symbolic parsing the user-input symbolic representation of the pixel-intensity weighting function;
    generating a computer-readable pixel-intensity weighting function; and
    applying the computer-readable pixel-intensity weighting function to pixel intensities.

6. The method of claim 5 further comprising:
    interactively displaying a graphical representation of the weighting function to allow a user to alter the graphical representation of a weighting function and thereby alter the computer-readable weighting function.

7. The method of claim 1 wherein the pixel-intensity weighting function input device is an interactive display.

8. The method of claim 7 further including receiving, through the interactive display, input of, and alterations to, a graphical representation of a weighting function.

9. The method of claim 1 wherein displaying a representation of a pixel intensity distribution to a user further includes displaying a color coded, two-dimensional representation of the pixel intensities within an area of a scanned image of a microarray to the user.

10. The method of claim 1 wherein displaying a representation of a pixel intensity distribution to a user further includes displaying a grey-scale coded, two-dimensional representation of the pixel intensities within an area of a scanned image of a microarray to the user.

11. The method of claim 1 further including:
    soliciting from the user a region of interest of the scanned image of a microarray within which to apply a weighting function.

12. The method of claim 11 wherein a region-of-interest is input by the user into region-of-interest specification device.

13. The method of claim 12 wherein the region-of-interest specification device is a text input window into which the user enters a symbolic representation of the region of interest.

* * * * *

UNITED STATES PATENT AND TRADEMARK OFFICE
CERTIFICATE OF CORRECTION

PATENT NO. : 7,372,982 B2
APPLICATION NO. : 10/342841
DATED : May 13, 2008
INVENTOR(S) : Le Cocq It is certified that error appears in the above-identified patent and that said Letters Patent is hereby corrected as shown below:

On the Title Page Item (57) under "Abstract", line 11, after "the" insert -- boundaries of a region of interest for the feature, and that allows the user to input a weighting --.

Signed and Sealed this

Nineteenth Day of August, 2008

JON W. DUDAS
*Director of the United States Patent and Trademark Office*